(12) United States Patent
Creed

(10) Patent No.: US 8,738,194 B2
(45) Date of Patent: May 27, 2014

(54) MOBILE MICRO-GRID POWER SYSTEM

(71) Applicant: John L. Creed, Niles, OH (US)

(72) Inventor: John L. Creed, Niles, OH (US)

(73) Assignee: Hunter Defense Technologies, Inc., Solon, OH (US)

( * ) Notice: Subject to any disclaimer, the term of this patent is extended or adjusted under 35 U.S.C. 154(b) by 0 days.

(21) Appl. No.: 13/658,416

(22) Filed: Oct. 23, 2012

(65) Prior Publication Data

US 2013/0057067 A1 Mar. 7, 2013

Related U.S. Application Data

(62) Division of application No. 12/764,525, filed on Apr. 21, 2010, now Pat. No. 8,315,745.

(60) Provisional application No. 61/172,379, filed on Apr. 24, 2009.

(51) Int. Cl.
H02J 4/00 (2006.01)

(52) U.S. Cl.
USPC .......................................... 700/295; 700/297

(58) Field of Classification Search
None
See application file for complete search history.

(56) References Cited

U.S. PATENT DOCUMENTS

| | | | |
|---|---|---|---|
| 4,942,863 A | 7/1990 | Chou et al. | |
| 5,317,857 A | 6/1994 | Allison | |
| 5,442,335 A | 8/1995 | Cantin et al. | |
| 6,527,548 B1 | 3/2003 | Kushch et al. | |
| 7,010,363 B2 | 3/2006 | Donnelly et al. | |
| 7,149,605 B2 | 12/2006 | Chassin et al. | |
| 7,230,819 B2 | 6/2007 | Muchow et al. | |
| 7,635,926 B2 | 12/2009 | Willets et al. | |
| 8,315,745 B2 * | 11/2012 | Creed | 700/295 |
| 8,364,287 B2 * | 1/2013 | Pearson et al. | 700/11 |
| 2002/0036430 A1 | 3/2002 | Welches et al. | |
| 2005/0034023 A1 | 2/2005 | Maturana et al. | |
| 2007/0038335 A1 | 2/2007 | McIntyre et al. | |
| 2007/0243425 A1 | 10/2007 | Spaner | |
| 2007/0273210 A1 * | 11/2007 | Wang et al. | 307/45 |
| 2007/0273213 A1 | 11/2007 | Wang et al. | |
| 2007/0273214 A1 | 11/2007 | Wang et al. | |
| 2008/0068782 A1 | 3/2008 | Muchow et al. | |
| 2008/0169704 A1 * | 7/2008 | Ferraro et al. | 307/64 |
| 2008/0212343 A1 | 9/2008 | Lasseter et al. | |
| 2008/0296973 A1 | 12/2008 | Ito et al. | |
| 2009/0326724 A1 | 12/2009 | Lasseter et al. | |
| 2010/0179704 A1 | 7/2010 | Ozog | |

FOREIGN PATENT DOCUMENTS

| | | |
|---|---|---|
| GB | 2 329534 | 3/1999 |
| WO | WO 2009/009176 | 1/2009 |
| WO | WO 2010/093476 | 8/2010 |

OTHER PUBLICATIONS

Tanrioven, M., "Reliability and Cost-Benefits of Adding Alternate Power Sources to an Independent Micro-grid Community", Journal of Power Sources 150 (2005): 136-149.

* cited by examiner

*Primary Examiner* — Ryan Jarrett
(74) *Attorney, Agent, or Firm* — Fay Sharpe LLP

(57) ABSTRACT

Methods and control apparatus are presented for controlling supply of electrical power to a mobile micro-grid power system, in which a master controller automatically rebalances the micro-grid by activating and deactivating individual power supplies to preferentially activate non-fuel consuming power supplies and deactivate fuel consuming power supplies so as to minimize fuel consumption for the micro-grid power system.

14 Claims, 10 Drawing Sheets

MOBILE MICRO-GRID POWER SYSTEM

REFERENCE TO RELATED APPLICATION

This application is a divisional of, and claims priority to and the benefit of, U.S. patent application Ser. No. 12/764,525, which was filed Apr. 21, 2010, entitled MOBILE MICRO-GRID POWER SYSTEM CONTROLLER AND METHOD, which claims priority to and the benefit of U.S. Provisional Patent Application Ser. No. 61/172,379, which was filed Apr. 24, 2009, entitled MICRO-GRID POWER SYSTEM AND CONTROL METHOD, the entireties of which applications are hereby incorporated by reference.

FIELD OF THE INVENTION

The present disclosure generally relates to power distribution and control systems. In particular, the present disclosure is directed to a military expeditionary or mobile micro-grid power system and method of controlling appliance consumption, power distribution, electrical energy generation, collection, storage and/or subsequent distribution, by the gathering of information concerning on line and off line power sources and on or off appliance loads.

BACKGROUND

The definition of a micro-grid varies throughout the civilian and military expeditionary energy community. The various micro-grid definitions can be characterized by their scope of service and ownership structure. Scope of service could range from small commercial individual facilities that use micro-grids to substations whose loads are supplied with micro-grids and a fully mobile military micro-grid. The definition varies for end-use customers, landlords, municipal utilities and investor-owned utilities. Each of these owners is looking for a different configuration value from a micro-grid and has a different "sweet spot" for the scope and definition of service. Industry, military and academia such as DTE Energy, the Consortium for Electric Reliability Technology Solutions (CERTS), the Electric Power Research Institute (EPRI), the European Research Project Cluster, Northern Power, the Gas Technology Institute (GTI), ENCORP, the National Renewable Energy Laboratory NREL, GE, Lawrence Berkeley National Lab, Project Manager (PM) Mobile Electric Power (MEP) and the US Army Corps of Engineers all have differences in functionality, and hence a difference in the definition of a micro-grid. The expeditionary or mobile type of micro-grid discussed in this disclosure is very different than what would be used commercially in that the grid size can be considered one power supply (e.g., a mobile generator, vehicle export AC or DC, battery storage AC or DC, or fuel cell) distributing to one shelter, or to a larger, but limited group of shelters. This arrangement can be enlarged to supply power to larger camps and related appliances used within a camp, although a larger camp may include a set of individual micro-grids within the same camp, that are not tied to one another.

Historically an expeditionary military fielded military micro-grid is an electrical distribution system connecting any combination of single, multiple soft or hard wall shelters, maintenance shelters, electric kitchens, showers, washer/dryers, and personnel equipment such as hair dryers, radios, and televisions as an example. This distribution system's electrical power is supplied by one or more mobile diesel generators of various kW outputs that are generally positioned around the outside perimeter of the distribution system.

An example of a fielded micro-grid would be for a Bare Base troop bed-down operation. Force Provider for the Army and Harvest Eagle and Harvest Falcon for the Air Force are AC engine generator supplied micro-grid users. The Navy and Marine Corps have constructed permanent and quasi-fixed bare base facilities that also use micro-grid generator power.

The number of individual micro-grids that are needed can range from a small Patrol Expeditionary Camp (PEC), for example, with three shelters and a shower using two micro-grids and two generators for energy supply, distribution infrastructure, to a medium (e.g., 150 man) camp with housing, feeding, laundry, shower systems and Environmental Control Units (ECU e.g. a military hardened AC that use six micro-grids and six generators), to large (e.g., 5,000 man) camps with full size complementary infrastructure such a larger kitchens, laundries, heated showers, food refrigeration and freezers, employing many ECUs that would use prime power (larger not easily towable generators) with the amount of individual micro-grids broken down into sections to supply the camp. The power and energy consumption control methods described below pertain to the various individual micro-grids, and configurations that operate individually within the same camp or foot print that uses mobile generation and/or renewable energy. This disclosure may also provide fuel savings when used with prime power equipped camps. The difference between mobile and prime power is, prime power utilizes 100 KW or larger generators, buried high voltage cable with transformers serving large sections of the camp and is somewhat permanent in design losing its expeditionary value. Mobile expeditionary generators are sized to be towed with smaller vehicles, such as the Humvee, and are used to operate small individual micro-grids within the camp. Fielded expeditionary micro-grid use, as discussed above, is currently configured with many separate stand alone micro-grids in use within the camp, operating each micro-grid as an island within the camp to insure adequate power to each of the individual grids.

Expeditionary military micro-grids are ever changing dynamic systems that when fielded are arranged in many configurations to facilitate the various camp assets, locations and type of camp operation. Inherent to a mobile micro-grid, is the effect of changing energy loads of a small number of appliances, where ECUs laundry and showers can cause the electrical energy on its micro-grid to drop. Typically, excess generator energy capacity is provided on each grid to accommodate such on/off cycling and peak demand loads. Unlike large commercial energy providers, the grouping of individual small size micro-grids in one expeditionary camp makes it impractical to define a fuel-efficient base load. For instance, the addition of one air-conditioner can cause a momentary brown out of one grid during the inrush energy load. A mobile military micro-grid is typically not staffed with operators monitoring system loads and capacity, and consequently the many individual micro-grids comprising one camp may not operate at optimum power generation and fuel efficiency.

Current art employs two methods of generator power supply side management techniques, both maintaining a percentage of reserve capacity above the base load. The first method is the most basic of control and is the legacy and current configuration extensively used today in a mobile micro-grid. The generators are started manually and left running as long as the power is needed. This may be a single generator or a plurality of generators operating on one common micro-grid, or a plurality of mobile generators each operating it respective micro-grid. One disadvantage of using many individual micro-grids is due to the fact that the generators are not able to communicate and load share with each other or with generators of different sizes. Another disadvantage is the inability to connect individual micro-grids into larger distribution networks. The second prior art method of generator capacity control is one in which the mobile generators can communicate with each other to curtail or add generator operation as load and reserve conditions warrant. This communication provides load sharing between generators of the same or different sizes and provides the power control to connect or consolidate individual micro-grids. This commercially available control function will likely be incorporated in future expeditionary camps, in one form or another, to interconnect what are now stand alone micro-grids to automatically turn on and off generators. In this arrangement, a designated main Generator Set Controller (GSC) may broadcast a control signal to other GSC equipped generators when engine start or connection to buss is desired to maintain reserve capacity (e.g., percentage of reserve power has been exceeded by the growing base load). Reacting to the random appliance starting inrush and operational consumption that increased the base load, tripping the reserve energy setting of the designated main GSC. This event causes the GSC to add reserve capacity to re-establish the same base load to reserve capacity profile. This power control method provides better fuel savings than letting the generators run but still requires excess capacity to be on line continuously adjusting the excess spinning capacity as the camp base load increases or decreases. Though this method of distributed mobile generator control will reduce the amount of stand alone micro-grids, reduce the amount of individual generators running, and lower the fuel use, substantial capacity is still maintained to prevent brownout or equipment shutdown due to low power.

A deficiency is this control method is the inability to incorporate new energy supplies such as vehicle export and non-engine derived energy, such as renewable or stored battery energy, in a plural power supply environment.

Another disadvantage of this prior art method is the necessity of maintaining excess energy on line or in standby to be instantly ready (spinning) to operate a mobile micro-grid and is one of the main causes of fuel inefficiency.

Another disadvantage is the inability to predict or preplan power supply requirements in relation to energy consumption. This directly contributes to the inefficient use of fuel, energy, and/or other resources such as maintenance and logistics.

Due to the very small size of the mobile micro-grid another disadvantage when programming the generator controller for distribution, is the issue of what energy level is established to insure each of a grid's supply functions such as base load, load following, or peak power in any efficient manner. The inability to predict or preplan power supply requirements in relation to energy consumption directly contributes to the inefficient use of fuel, energy, and/or other resources such as maintenance and logistics.

Another inefficient shortcoming is the inability of the prior art systems to select from different generator capacities and non mobile generator energy supply sources such as renewables.

Another deficiency is that the mobile micro-grid is of such small size (low capacitance) that there is no average rise or reduction in demand, as appliances are turned on, because an instant response is required necessitating the operator to program higher reserve and surge capacity, increasing the spinning reserve capacity and wasting fuel.

Another inefficient shortcoming is the inability to sync phases between mobile generators and stored energy when the load can be carried by stored energy and the generators are restarted for larger loads.

Another inefficient shortcoming is a lack of communication based on a pre-communicated consumption appliance profile of resistive, inductive, or capacitive load energy required before appliance operation to forewarn the supply side to select the best fuel efficient method of power supply combinations before the individual appliance is allowed to run.

Yet another inefficient shortcoming of the prior art systems is the inability to load share diesel-operated generators with fuel cell generation, vehicle export power and renewable energy sources such as wind, solar, and energy storage systems.

Yet another inefficient shortcoming is the inability to ping the micro-grid to ascertain the supply, base load and inrush energy needed to operate the associated micro-grid.

SUMMARY

Various aspects of the present disclosure are now summarized to facilitate a basic understanding of the disclosure, wherein this summary is not an extensive overview of the disclosure, and is intended neither to identify certain elements of the disclosure, nor to delineate the scope thereof. Rather, the primary purpose of this summary is to present some concepts of the disclosure in a simplified form prior to the more detailed description that is presented hereinafter.

The present disclosure provides improved power management and distribution systems and methods for fielded expeditionary, remote and/or temporary micro-grid installations that manage power resources efficiently while supplying the power needs of the micro-grid installation.

In accordance with one or more aspects of the present disclosure, a method is provided for controlling supply of electrical power to a mobile micro-grid power system. The method includes obtaining power supply profile data from a plurality of power supplies operatively coupled with the mobile micro-grid power system, and obtaining micro-grid load data associated with a plurality of electrical loads operatively coupled with the mobile micro-grid power system. A load profile and an active reserve power level are determined for the micro-grid based in whole or in part on the micro-grid load data, and the supply of electrical power to the micro-grid is balanced by setting the power supply activation states based at least in part on the load profile and the active reserve power level. The method further includes receiving a load activation request indicating requested activation of one or more currently deactivated loads, a load deactivation notification indicating deactivation of one or more currently activated loads and/or a power supply status change notification indicating a change in a status of a currently active power supply. Based on this as well as the load profile and the active reserve power level, a determination is made automatically as to whether rebalancing of the micro-grid electrical power supply is needed. If so, the method includes automatically rebalancing the supply of electrical power to the micro-grid power system by changing an activation state of one or more of the plurality of power supplies based at least partially on the load profile and the active reserve power level.

In accordance with further aspects of the disclosure, the automatic rebalancing in certain embodiments includes automatically selecting one or more power supplies for activation state change based at least in part on one or more fuel consumption parameters associated with the plurality of power supplies and according to the load profile and the active reserve power level, as well as changing the activation state of one or more selected power supplies. In certain embodiments, moreover, the automatic selection of power supplies for activation state change is done so as to minimize fuel consumption for the micro-grid power system, for example, by automatically determining a best fuel-efficient combination of the micro-grid power supplies based at least partially on one or more power supply fuel consumption parameters.

In accordance with further aspects of the disclosure, the automatic selection of power supplies for activation state change includes selecting at least one currently deactivated power supply for activation and selecting at least one currently activated supply for deactivation. In certain implementations, this includes preferentially selecting at least one currently deactivated non-fuel consuming power supply for activation and selecting at least one currently activated fuel consuming power supply for deactivation. In certain embodiments, this involves preferentially selecting one or more currently deactivated solar energy-based or wind-energy based supplies and/or battery or capacitive storage-type power supplies for activation.

In accordance with further aspects of the disclosure, certain embodiments of the method also include rebalancing the supply of electrical power to the micro-grid periodically or upon user request by automatically selecting one or more power supplies for activation state change based in whole or in part on one or more power supply fuel consumption parameters and on the load profile and the active reserve power level, and changing the activation state of one or more selected ones of the plurality of power supplies.

In accordance with other aspects of the disclosure, the automatic selection of power supplies for activation state change is done at least in part to reduce excess spinning reserve capacity in the micro-grid power system beyond the determined active reserve power level, to increase efficiency of at least one fuel-consuming generator, to control the power factor of the micro-grid power system, and/or to control peak shaving in the micro-grid power system.

In accordance with still other aspects of the disclosure, certain embodiments of the method also include delaying activation of one or more specific loads for which a load activation request has been received until either the supply of electrical power to the micro-grid has been rebalanced to accommodate the requested activation or until a determination has been made that the current micro-grid power is sufficient to accommodate the requested activation.

In accordance with further aspects of the disclosure, certain embodiments of the method also include obtaining updated power supply profile data and/or updated micro-grid load data based on receipt of a load activation request, a load deactivation notification, and/or an active power supply status change notification.

In accordance with other aspects of the disclosure, a non-transitory computer readable medium is provided, which includes computer executable instructions for controlling the supply of electrical power to a mobile micro-grid power system according to one or more disclosed methods.

Further aspects of the disclosure relate to an automated system for controlling a plurality of power supplies operatively coupled with a mobile micro-grid power system. The system includes a master controller operatively coupled with the power supplies and with a plurality of electrical loads that are coupled with the micro-grid power system. The master controller is operative to obtain power supply profile data from the power supplies and to obtain micro-grid load data associated with the electrical loads. The master controller determines a load profile and an active reserve power level for the micro-grid based at least partially on the micro-grid load data, and balances the micro-grid by setting activation states of one or more power supplies based in whole or in part on the load profile and the active reserve power level. The master controller receives load activation requests, load deactivation notifications, and/or power supply status change notifications, and automatically determines whether rebalancing of the micro-grid electrical power supply is needed based on the received requests and/or notifications, as well as on the load profile and the active reserve power level. If so, the master controller automatically rebalances the micro-grid by changing activation states of one or more power supplies, based at least partially on the load profile and the active reserve power level.

In accordance with further aspects of the disclosure, the master controller may be integrated into one of the power supplies.

In accordance with still other aspects of the disclosure, certain embodiments of the master controller are operative to rebalance the micro-grid by automatically selecting one or more of the plurality of power supplies for activation state change based at least partially on one or more power supply fuel consumption parameters in order to minimize fuel consumption for the micro-grid power system and to change the activation state of selected power supplies. In certain implementations, the master controller makes the activation status change selection according to one or more further considerations, such as reducing excess spinning reserve capacity in the micro-grid, increasing efficiency of at least one fuel-consuming generator supply, controlling micro-grid power factor, and/or controlling peak shaving in the micro-grid.

In accordance with further aspects of the disclosure, certain embodiments of the master controller are operative to delay activation of one or more specific loads for which a load activation request has been received until either the supply of electrical power to the micro-grid power system has been rebalanced or until it has been determined that the current supply of electrical power to the micro-grid is sufficient to accommodate the requested load activation. In certain embodiments, the master controller is operative for at least one received load activation request to give permission to activate a partial requested load and to delay permission for activation for a remainder of the requested load until the micro-grid power system is rebalanced.

In accordance with other aspects of the disclosure, certain embodiments of the master controller are operative to rebalance the micro-grid by selecting at least one currently deactivated power supply for activation and selecting at least one currently activated supply for deactivation and by changing the activation state of selected power supplies. In certain implementations, the master controller preferentially selects one or more currently deactivated non-fuel consuming power supplies, such as solar or wind energy-based power supplies and/or battery or capacitive storage-type power supplies for activation, and selects one or more currently activated fuel consuming power supply for deactivation.

In accordance with further aspects, the master controller selectively adjusts the power supply profile data, the micro-grid load data, and/or the load profile based at least in part on environmental information relating to the environmental condition of the micro-grid and/or location information relating to the geographical location of the micro-grid.

In accordance with further aspects, the master controller in certain embodiments is operative to rebalance the supply of electrical power to the micro-grid power system by changing an activation state of one or more of the plurality of power supplies based at least partially on an indication of imminent loss of at least one of the power supplies.

Further aspects of the disclosure relate to a mobile stand-alone micro-grid power system disconnected from utility power, which includes one or more mobile loads that are capable of consuming electrical power when activated, as well as a plurality of mobile power supplies operatively coupled with the load(s) and with one another to form a mobile micro-grid arrangement. The power supplies include one or more mobile non-fuel consuming power supplies operatively coupled to provide electrical power to the micro-grid when activated, one or more mobile fuel consuming generators operatively coupled to provide electrical power to the micro-grid when activated, and one or more mobile energy storage systems operative to store electrical energy and operatively coupled to provide electrical power to the micro-grid when activated. The system further includes one or more delay demand devices operative to control activation of the at least one mobile load, as well as a master controller operatively coupled with the power supplies and load(s), where the master controller automatically rebalances the micro-grid by changing an activation state of one or more of the power supplies.

In accordance with other aspects of the disclosure, certain embodiments of the master controller are operative to automatically rebalance the mobile micro-grid by preferentially activate at least one non-fuel consuming power supply and/or preferentially deactivate at least one fuel consuming power supply so as to minimize fuel consumption for the mobile micro-grid power system.

In accordance with other aspects of the disclosure, certain embodiments of the master controller are operative to obtain power supply profile data from the power supplies and to obtain micro-grid load data associated with the electrical loads. The master controller determines a load profile and an active reserve power level for the micro-grid based at least partially on the micro-grid load data, and balances the micro-grid by setting activation states of one or more power supplies based in whole or in part on the load profile and the active reserve power level. The master controller receives load activation requests, load deactivation notifications, and/or power supply status change notifications, and automatically determines whether rebalancing of the micro-grid electrical power supply is needed based on the received requests and/or notifications, as well as on the load profile and the active reserve power level. If so, the master controller automatically rebalances the micro-grid by changing activation states of one or more power supplies, based at least partially on the load profile and the active reserve power level.

BRIEF DESCRIPTION OF THE DRAWINGS

The disclosure may take form in certain structures, components, and/or methodologies, several embodiments of which will be described in detail in this specification and illustrated in the accompanying drawings. The following description and drawings set forth certain illustrative implementations of the disclosure in detail, which are indicative of one or more exemplary ways in which the various principles of the disclosure may be carried out. The illustrated examples, however, are not exhaustive of the many possible embodiments of the disclosure. Other objects, advantages and novel features of the disclosure will be set forth in the following detailed description when considered in conjunction with the drawings, in which.

DETAILED DESCRIPTION

Figure 1:
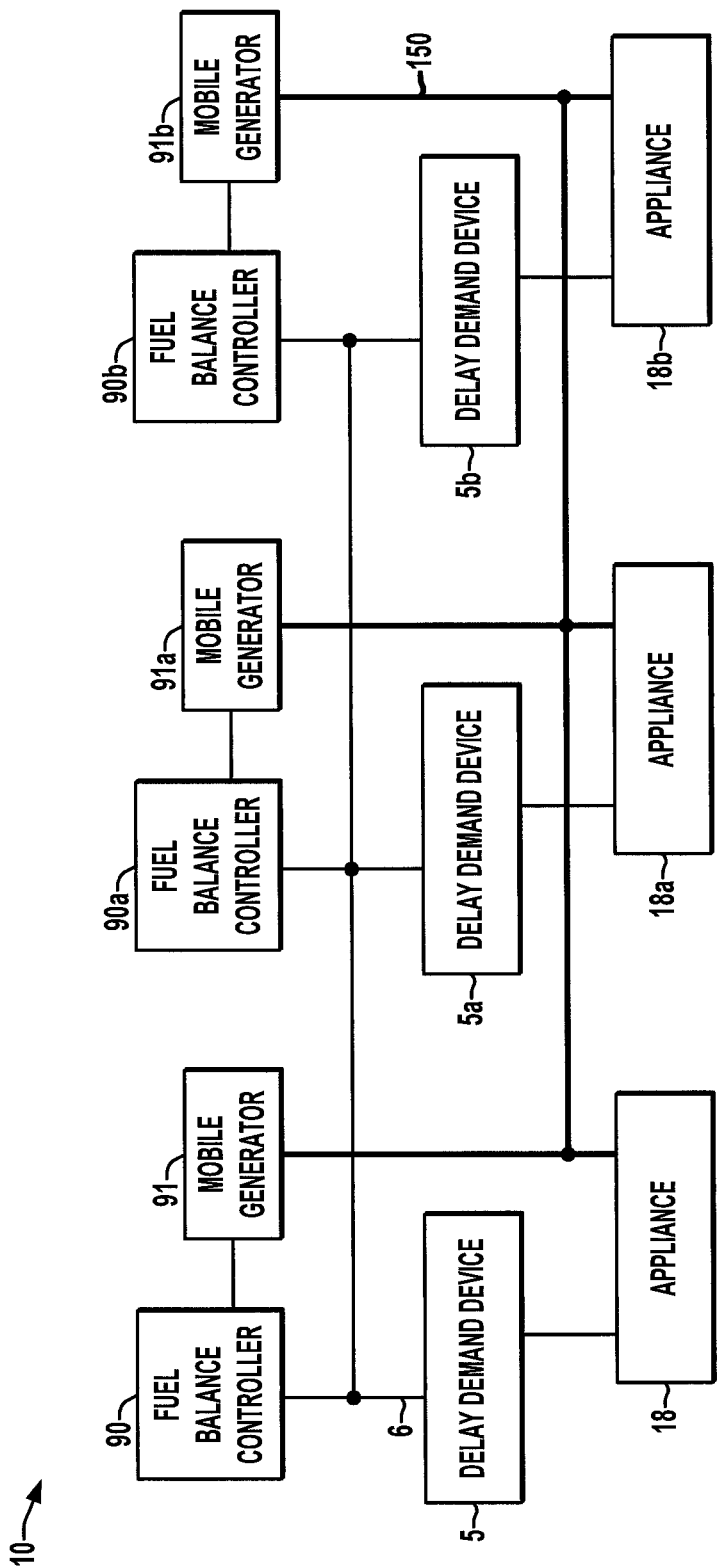
FIG. 1 is a system diagram illustrating a first embodiment of a micro grid power system, according to the present disclosure.

This disclosure embodies the initial set up, operation and fuel efficient monitoring and subsequent energy rebalancing of a field-able, mobile expeditionary, electrical energy supply, connected to a common electrical grid supplying electrical energy for consumption in a military fielded expeditionary application. As previously noted, expeditionary or mobile micro-grid systems are those that are portable via trucks for supporting military camps of about 150 persons or less and may provide electrical power for various associated equipment including soldier needs as well as powering an associated command and control center and the corresponding equipment, and mobile micro-grid systems are disconnected from utility grid power. This disclosure provides the user in field ability to arrange or rearrange size and/or types of power generation, renewable and energy storage for efficient fuel use. Matching of base and peak loads of connected appliances or groups of appliances before grid operation (e.g. before being put in service) provides the ability to rearrange the type and or amount of energy supply devices and appliances, or groups of appliances before or during operation. This disclosure also provides the field user with the ability to arrange or rearrange the micro-grid size and or inter-connection with other micro-grids within the camp. This disclosure depicts methods of intelligent selection of supply types and power levels based on connected pre-operation power source energy profiles with a communicated pre-use connected appliance load profiles. This disclosure addresses a "plug and play" intelligent power selection, delivery and consumption architecture as a stand-alone or island electrical grid of supply and demand, that can be used in a fielded application not connected to (physically spaced away from) a utility owned distribution (local electric power).

It should be noted, the term of efficient fuel use, or best efficiency in the following discussion relates to the amount of fossil fuel used due to engine efficiency (torque efficiency curve and loading of respective engine) and not necessarily the efficient use of electrical energy. Some aspects of this disclosure refer to the ability to select an engine or engines and operate the engine driven generator in the best torque curve to reduce the amount of fuel converted to electrical output. Other aspects of this disclosure refer to the ability of automatic phase syncing and rebalancing of power supplies to non-engine driven generation for fuel saving power management. Also, the following discussion is responsive to providing sufficient electrical energy using the least amount of fuel such as Diesel-1, Diesel-2, JP-8, Diesel Fuel Arctic, Kerosene, and similar distillates.

This disclosure can be considered an "overlay" to the standard generator equipped Generator Set Controller (GSC). That is, certain embodiments add function ability by communicating with the various mobile generator control systems designed and installed into military or Commercial Off The Shelf (COTS) mobile generator sets. These microprocessor-based gen-set controllers or GSCs provide general characteristics such as engine cranking, engine protection and generator metering capabilities such as synchronizing, load control, soft load transfer, power control, alarms, current of various circuits or phases (e.g., L1-L2-L3-N), voltage control and measures and data such as active and reactive energy, power factor, engine speed, event logs, voltage, current, and frequency as an example. Real time information managed by the GSC is shareable by communication protocols such as Modbus. Modbus, as an example, provides a complete register list to allow for total access to all information. This disclosure may also communicate with battery storage, high energy "super" capacitors, vehicles that supply export power and fuel cell generation systems using Modbus or other similar communication protocols.

With reference to FIG. 1, a micro-grid electrical power distribution system 10 is shown arranged according to one exemplary illustrative embodiment. System 10 comprises a military micro-grid system configured to deliver electrical energy from a fielded micro-grid supply to various camp appliances. The depicted exemplary system 10 comprises a plurality of exemplary fuel balance controllers (FBC) 90, 90a, 90b a plurality of mobile power supplies (e.g., mobile generators) 91, 91a, 91b, a mobile distribution micro-grid 150, data communication network 6, and an exemplary plurality of delay management devices (DDD) 5, 5a, 5b, and/or mobile appliance loads 18, 18a, 18b.

With continued reference to FIG. 1, first FBC 90 is coupled to the first mobile generator 91, the second FBC 90a is coupled to mobile generator 91a, and the third FBC 90b is coupled to the third mobile generator 91b and so on. The first, second, and third FBCs 90, 90a, 90b, respectively, are depicted communicating with each other and the plurality of delay management devices 5, 5a, 5b via a data network 6. In addition, each appliance in this example has a Delay Demand Device (DDD) coupled to its respective appliance 18, 18a, 18b, although not a strict requirement of the disclosure. Electrical power characteristics relating to each specific generator are stored in each respective FBC. Electrical power characteristics relating to each specific appliance and or group of appliances (not shown) is stored in each respective DDD.

With further reference to FIG. 1, the plurality of appliances 18 is coupled with the mobile electrical power distribution system micro-grid 150 and may send a request for start (load activation request) with accompanying operational load profile information. This request to consume electrical power from the micro-grid 150 is received by FBC 90. This call for operational load is evaluated against a plurality of (connected to a common micro-grid) available power supplies (e.g., mobile generators 91, 91a, 91b, etc.) sharing respective state of electrical energy output, available reserve capacity, and power conversion characteristic data stored in each respective generator FBC memory, and the operational load call (activation request) is compared to running or non running load profiles stored in the memory of each respective appliance delay demand device (DDD) 5, 5a, 5b. In some embodiments, mobile generators 91 and/or appliances 18 may be considered to be part of the system 10, (e.g., in configurations wherein fuel saving power management operations are implemented using associated control circuitry of the appliances and generators as described in exemplary embodiments below).

FBC 90 is configured as a control circuitry to monitor and manage supply energy capacity of system 10 in some embodiments. FBC 90 may comprise a microprocessor in one embodiment to implement exemplary monitoring and control aspects of the fuel saving power management operations described herein. FBC 90 may be referred to as a centralized controller or master controller in one embodiment and for example, operates from DDD 5 request to start or notice of shut off input signals or messages. Based on the level and type of power request from DDD 5, the FBC 90 may start and or stop additional mobile generators to implement power management operations (balancing, rebalancing, etc.). First DDD 5 can be configured as control circuitry to manage operation of appliance 18. The delay demand devices 5 may comprise a microprocessor in one embodiment to implement exemplary control aspects of a military micro-grid power management operations described herein.

In other arrangements, the FBC may monitor electrical energy distributed within the system and issue appropriate control signals to a plurality of other FBCs, in response to the DDDs via a network, (hard-wired or wireless) to implement fuel saving electrical power management of micro-grid Implementation of fuel saving power management operations by the FBC, configured in the above-identified one-at-a-time single appliance start and operate embodiment may be referred to as an individual appliance load start request.

In operation, one FBC (e.g., FBC 90) or other control element operatively coupled with the micro-grid is configured as master controller of the micro-grid system 10. The master controller 90 obtains power supply profile data from the power supplies 91 and obtains micro-grid load data associated with the electrical loads 18, whether directly from the load appliances 18 or from the associated delay demand devices 5 or combinations thereof The master controller determines a load profile and an active reserve power level (e.g., spinning reserve, although the active reserve power level can include capacity of non-spinning sources, such as solar or wind-energy type supplies, battery or capacitor-type storage supplies, etc.) based at least partially on the micro-grid load data, and balances the micro-grid by activating or deactivating (e.g., setting activation states of) one or more power supplies 91 based in whole or in part on the load profile and the active reserve power level. The master controller 90 receives load activation requests, load deactivation notifications, and/or power supply status change notifications, and automatically determines whether rebalancing of the micro-grid is needed based on the received requests and/or notifications, as well as on the load profile and the active reserve power level. If so, the master controller 90 automatically rebalances the micro-grid 150 by changing activation states of one or more power supplies 91 based at least partially on the load profile and the active reserve power level. In the example of FIG. 1, the master controller may be integrated into one of the supplies 91, and other embodiments are possible in which the master controller 90 is a separate device.

The master controller 90 in certain embodiments rebalances the micro-grid system 10 by automatically selecting one or more power supplies 91 for activation state change based at least partially on one or more power supply fuel consumption parameters in order to minimize fuel consumption for the micro-grid power system and changes the activation state of selected power supplies 91 according to the selection. In certain implementations, the master controller 90 makes the activation status change selection according to one or more further considerations, such as reducing excess spinning reserve capacity in the micro-grid, increasing efficiency of at least one fuel-consuming generator supply, controlling micro-grid power factor, and/or controlling peak shaving in the micro-grid. The master controller 90, moreover, is configurable in certain embodiments to delay activation of one or more specific loads 18 for which a load activation request has been received until either the supply of electrical power to the micro-grid power system has been rebalanced or until the master controller 90 determines that the current supply of electrical power to the micro-grid is sufficient to accommodate the requested load activation. In various embodiments, the master controller 90 rebalances the micro-grid system 10 by selecting at least one currently deactivated power supply 91 for activation and selecting at least one currently activated supply 91 for deactivation and by changing the activation state of selected power supplies 91. In certain implementations, the master controller 90 preferentially selects one or more currently deactivated non-fuel consuming power supplies 91, such as solar or wind energy-based power supplies and/or battery or capacitive storage-type power supplies for activation, and selects one or more currently activated fuel consuming power supply for deactivation, as described further below.

Figure 3:
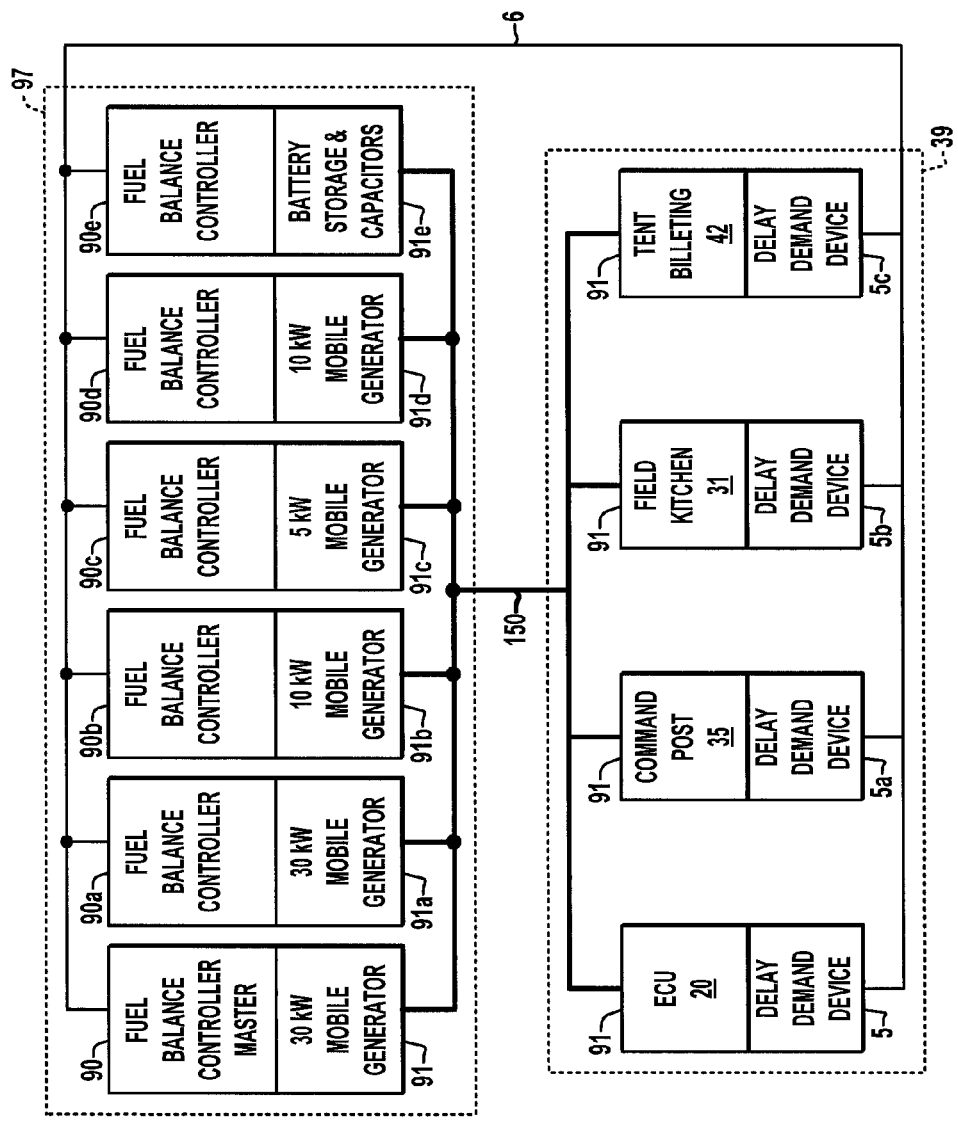
FIG. 3 is a system diagram illustrating one embodiment of a micro grid system of FIG. 1, illustrating a power supply comprised of various power sources and a generalized load comprised of various individual loads.

A DDD 5 may be implemented in certain embodiments at a consolidation of power appliances location (e.g., electric kitchen, batch laundry, cold food storage, in tent power panel etc. as shown in FIG. 3). For example, appliances 18 can be grouped by the service they provide (e.g., food preparation including baking, steam cooking, grilling, sanitization, etc.). A DDD 5 can be mounted locally to provide one power request for the group of appliances 18 needed to perform such a common operational task from the FBC 90. Implementation of such power management operations by the FBC 90, configured in the above-identified common service application example may be referred to as a group appliance power request. Accordingly, in at least some exemplary embodiments, the FBC 90, may provide a centralized management operations described. Furthermore, one FBC 90 may be configured as a master and serve as a centralized hub and be arranged to monitor and control supply and consumption (as will be discussed later with respect to FIG. 10), for example, directly or through communication with other devices, including other (non-master) FBCs of the system 10.

In some embodiments and as mentioned above, the DDD 5 may be omitted and the request functionality for profiled load operation can be integrated within the appliances 18. A mobile generator 91 can be configured to supply various states of load imposed on the micro-grid 150. The mobile generator 90 may be arranged as two or more mobile generators or other construction configured to supply electrical energy that can be individually taken on-line or off-line, or the output thereof may be adjusted, according to the request for appliance start and energy profile requirement. The DDDs 5 upon request to begin appliance operation, provide a signal to the master controller FBC 90 containing appliance information, inrush and/or an operational energy value request. The master controller FBC 90 can compare available mobile generators 90 of the micro-grid (including active and deactivated supplies), present load, and reserve energy supply. If insufficient reserve energy is available to support the additional load request, the DDD 5 can deny a start request from the requesting appliance until adequate energy reserve levels are reconfigured and made available with the master controller 90 providing the necessary permission grant through messaging or signaling to the DDD 5. By contrast, typical micro-grid power distribution approaches attempt to stabilize a value of reserve electrical capacity such that these reserves may be used to accommodate fluctuations in demand and are typically increased to a potentially high (and inefficient) energy level to accommodate unexpected significant fluctuations in demand for electrical energy. Here, one aspect of this disclosure is to provide fuel savings control by reducing the need for such high levels of reserve capacity through master controller selection of smaller generators 91 as stand alone or in parallel operation from received energy profiles before consumption for adjustment of the power supplies 91.

In this manner, the master controller 91 operates and manages the micro-grid 150 to provide the electrical energy from the mobile generator(s) 91 to appropriate destinations for consumption with the capability to minimize or improve fuel consumption beyond the capabilities of unmanaged or undermanaged prior solutions. In other embodiments, the micro-grid system 10 may comprise a plurality of different voltage distribution lines and transformers configured to conduct the electrical energy through the camp. By way of example, the micro-grid may provide electrical energy at frequencies of 50/60 Hz and voltages of 114/126V, single phase, 2 wire, 120/240V, single phase, 3 wire, 120/208V, 3 phase, 4 wire, 240/416V, 3 phase, 4 wire or other appropriate voltages for usage by the respective loads and/or appliances of the micro-grid.

Generally, the DDDs 5 are configured to selectively present future start up load profiles and operational energy consumption through communication with its respective or master FBC 90, as described below. In the example of FIG. 1, all of the illustrated appliances 18, 18a, 18b, have associated DDDs 5, 51, 5b. In other arrangements, only some (or none) of the appliances 18 may have associated DDDs 5. In still other arrangements, a single DDD 5 may be configured to control a group or plurality of appliances 18.

Figure 11:
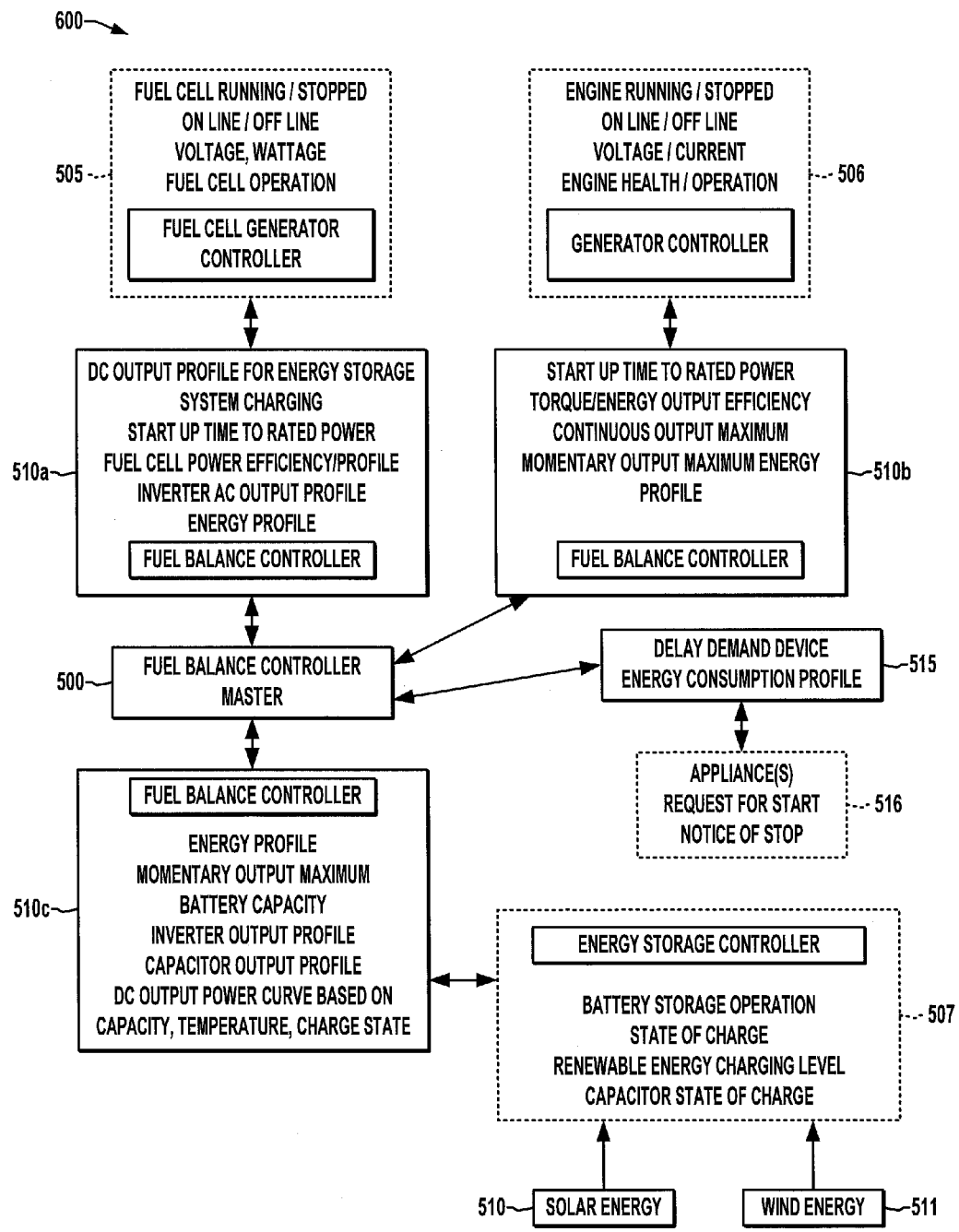
FIG. 11 is a flow chart illustrating the operation of a power management information system of the micro-grid system of FIG. 10.

The FBCs 90 are configured to selectively take off line, start, stop and sync mobile generators and other supplies 91 (e.g., including syncing of storage-type supplies with associated inverters), as described below. In the exemplary depicted implementation of FIG. 1, all of the illustrated mobile generators 91, 91a, 91b, have associated FBCs 90, 90a, 90b. In other arrangements FBCs 90, may be implemented entirely or partially using existing components of the mobile generator 91. For example, the functionality of one FBC may be implemented using the OEM generator controller (as depicted in FIG. 11) to monitor electrical energy of power distribution 10. In other arrangements, only some of the mobile generators 91 may have associated FBCs 90. In still other arrangements, an FBC 90 may control a plurality of mobile generators 91 or other power supply devices (e.g. battery storage, capacitors, vehicle export power, fuel cell, or self power heater export power).

Reduced generator operation or resizing of energy producing equipment may be implemented in a variety of power management configurations. In one such arrangement, the FBC 90 provides the operator (during setup of the camp or installation) a pre-grid operation query function of micro-grid 150. The total power supply configuration and individual power supply types and output capacities and appliance, delay management devices start up load profile and subsequent operational load by use of one mobile generator 91, supplying battery electrical for controller functions. When connected but in an off state in one embodiment, the mobile generators 91 (when queried by the FBC 90), transmit controller embedded power supply features (e.g., FIG. 12 step S12) when queried by the FBC 90 connected to micro-grid 150, and the DDD 5 supplies imbedded consumption features (e.g. appliance type, single or group load, inrush or starting energy profile, running energy consumption and other information as needed) to the master controller 90.

The ability to have a military mobile fieldable micro-grid that provides supply and load information reduces time and manpower to set up the micro-grid system 10, eliminates the possibility of brown outs, and provides information on the best size and/or quantity of mobile generators 91 for micro-grid thereby reducing excess generator capacity, maintenance, and fuel use while maximizing utilization of the mobile generators, and/or other connected energy supply devices. Conventional techniques and control apparatus do not provide a dynamic (though in a non-consumption state) pre-operational view of a micro-grid supply and demand, and do not offer corrective action with resizing of needed energy producing equipment using information based on tested power supply outputs under various load data and actual appliance consumption profile data of possible inrush and operational loads.

Field experience has shown that camp systems, after initial deployment tend to continuously grow in power demand. Furthermore, at any time, the operator may query the FBCs 90 and the individual energy supplies 91 (in an active or deactivated state) and appliance loads 18 (in an operational or non operational state) to update the configuration of supply and load. The FBC 90 may be configured to update and display to the operator the "new" appliance load reflecting any added or removed loads, this information would be used by the operator to increase and/or rebalance the power supply as needed. In another such arrangement, the FBC can be queried to update any change in power supply configuration any generators or other power supply sources for rebalancing of the power supply as needed. Generally, the FBC 90 includes control circuitry that may monitor electrical energy consumed on the micro-grid, query or issue control signals to mobile generators, and the DDDs 5. When queried, the DDDs 5 respond by providing start-up load and operational energy levels of the respective appliances on the micro-grid.

Figure 2:
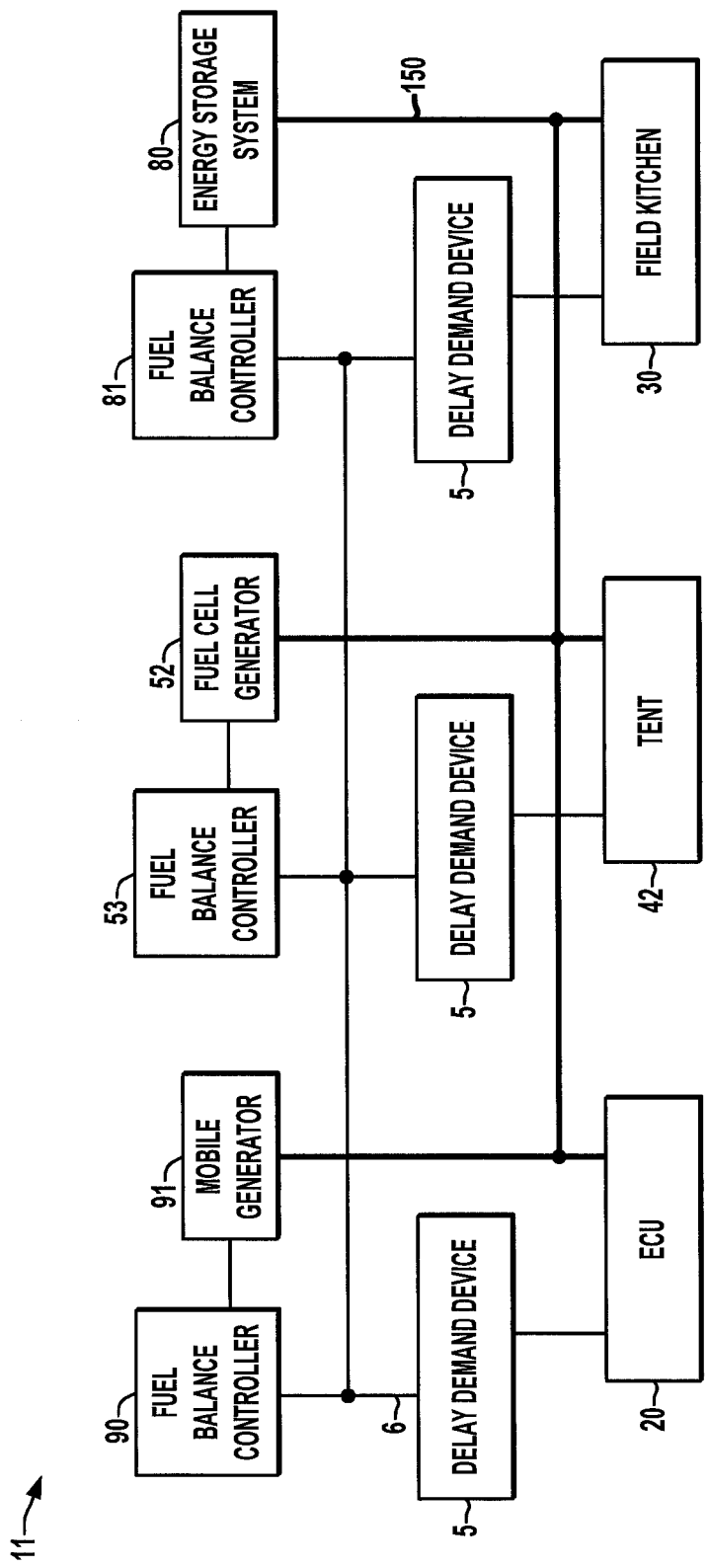
FIG. 2 is a system diagram illustrating a micro grid system of FIG. 1, as it relates to a military fielded installation.

Now with reference to FIG. 2, an electrical power distribution system 11 is shown arranged according to one exemplary illustrative embodiment. System 11 comprises a military fieldable micro-grid system configured to deliver electrical energy from a mobile energy supply to a variety of coupled camp appliances. The depicted exemplary system 11 comprises a plurality of exemplary power supplies. Energy supply is managed by a respective generator and/or energy storage system controller. The plurality of power supply types includes mobile generator 91, fuel cell generator 52, and energy storage system 80. The system further includes electrical energy distribution grid 150, controller communication network 6, an exemplary plurality of DDDs 5, and energy consuming appliances or groups of appliances (e.g., environmental control unit (ECU) 20, a tent 42, a field kitchen 30). The appliances, as discussed previously, can be selectively coupled to the micro-grid 150.

With continued reference to FIG. 2, ECU 20, tent 42, field kitchen 30, respective DDDs 5, may query the FBCs 90, 53, 81, upon receiving a start input from a second input request (e.g., operator manipulation of on/off switch, thermostat or other on/off input signal not shown). The DDDs may send stored non-volatile memory data of start and operational load profile information (see FIG. 9 for example) for permission to consume electrical energy from micro-grid 150. This electrical energy is provided from one or more or any combination of mobile generator 91, fuel cell generator 52, and energy storage system 80. In some embodiments, mobile generator 91, fuel cell generator 52, and energy storage system 80 may be considered to be part of the system 11 (e.g., in configurations wherein power management operations are implemented using associated control circuitry of the appliances and power supply system as described in exemplary embodiments below).

As discussed with respect to FIG. 1, the FBCs can be configured as a control circuitry to monitor and manage the base load and the reserve energy capacity of system 11. In still other embodiments, the FBCs may include a microprocessor to implement exemplary monitoring and control aspects of the power management operations described herein.

In yet other arrangements, the FBCs may provide a main operator user interface providing computational user information of system power on line and/or offline values, as well as appliance running and/or off load values providing control signals as master control of the dynamic supply and consumption of energy throughout the micro-grid. The benefits of reduced cost and simplified system architecture are to be gained by having only one master FBC with a user interface, with other FBCs being sub-controllers. A sub-controller would provide all necessary inputs to the master controller but lack the additional cost and complexity of additional memory, math calculations, larger user display interface and associated master control functions required to manage the system. In this arrangement one FBC would be designated by the user as master control and the remaining FBCs communication would default to sub-control functions.

According to specific arrangements of power supply devices (e.g., 91, 52, 80 of FIG. 2) being controlled, monitoring of energy supply and/or controlling the request for start and run of appliances or groups of appliances (e.g., 20, 42, and 30) may be implemented using circuitry internal and/or external of the controlled item or items. The discussion herein proceeds with respect to exemplary configurations wherein monitoring and control configurations may be used to implement fuel savings. Any alternate configurations may be used to implement functions and operations described herein according to fuel consumption considerations and/or other factors or operational goals, including without limitation to reduce excess spinning reserve capacity in the micro-grid power system beyond the determined active reserve power level, to increase efficiency of at least one fuel-consuming generator, to control the power factor of the micro-grid power system, and/or to control peak shaving in the micro-grid power system.

In one arrangement, the FBC 90 can monitor mobile generator 91, fuel cell generator 52, energy storage system 80, by communication with fuel cell generator controller 53, energy storage controller 81. In other arrangements vehicles or self powered heaters may provide energy to the micro-grid 150, by use of a heater or vehicle controller. FBC 90 communicates with DDD 5 by use of network 6. Delay management component 5 may communicate start and operational load information to FBC 90 when operator request for start is initiated. FBC 90 compares start and load information to determine if sufficient energy is available for the appliance to start and run.

FBC 90 provides overall power management of system 11 using one or more communications interface to continuous communicate by exchange of signals, values, and/or messages with energy supplies and consuming appliances or DDDs connected thereto, and operates to manage reserve electrical capacity and electrical energy distributed within system 11. The FBC 90 thereby issues appropriate control signals to micro-grid energy supply in response from DDD 5 via network 6 (e.g., wired or wireless communications) to implement system 11 with power management of micro-grid 150 by FBC 90.

Figure 9:
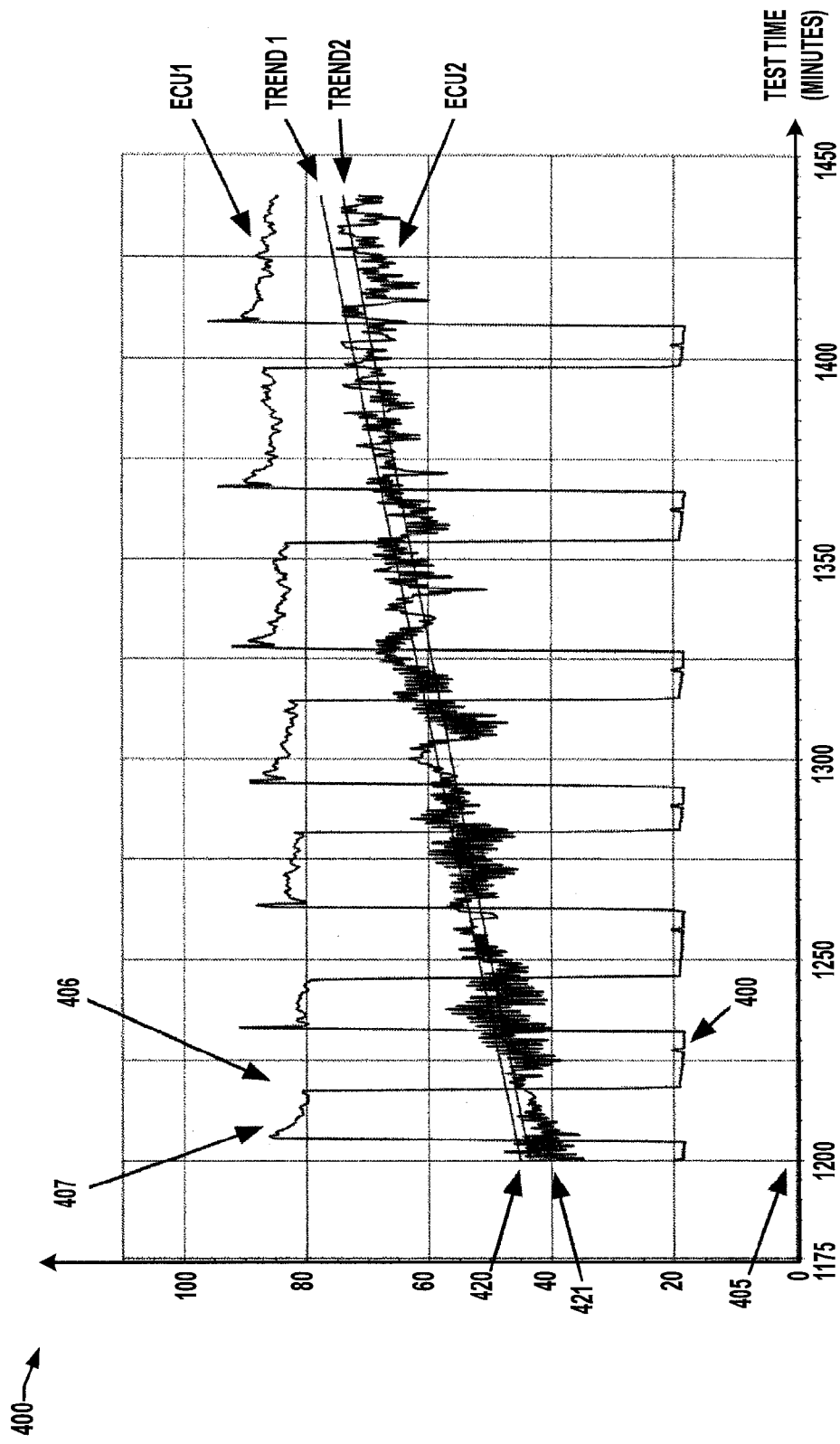
FIG. 9 is a graph illustrating the energy profile of two environmental control unit (ECU) loads of the micro grid system of FIG. 2.

A military fielded micro-grid comprises sufficient mobile generator capacity to supply the expected design load of the grid. Current art is to connect generators in parallel and manually start/stop them (e.g. to reduce fuel usage and maintenance) through the day in anticipation of increased loads (e.g. daytime heat load will increase ECU operation and energy requirement, night time heat load would reduce ECU use and lower energy requirement as an example). Another method of controlling mobile field generators is to equip with commercially available microprocessors that provide built in synchronizer and digital isochronous load sharer for generators in standby, island or mains parallel, with stop/start functions. This method of control uses generator energy output and energy reserve information supplied from each generator on the common micro-grid to a master controller. The addition or removal of generators from the grid is managed from a system reserve capacity preset by the operator. The power supply operates in a predetermined excess power capacity for self-regulated generator operation. As shown in FIG. 9, a graph of two different ECU designs is depicted. The amount of preset reserve power is based on these types depicted of loads. The operator preset reserve capacity will include the on and off cycling of ECU loads with the ability of starting additional generators when the preset reserve value is exceeded. The preset excess reserve is maintained by having multiple generators on line in a power sharing condition. This excess capacity reactionary control method is inefficient as generator reserve power is preset by trial and error to a high excess level of potential to accommodate any multiple of appliances or groups of appliances cycling on/off at random in an attempt to eliminate brown out and low cycle (hertz) conditions. A more detailed discussion of the foregoing is provided below with reference to FIG. 9.

Referring now to FIG. 3, exemplary configurations of power supplies and appliances of a military micro-grid are shown. In this arrangement, electrical power supply 97 may comprise a plurality of different associated power supplies 91, 91a, 91b, 91c, 91d, and 91e, individually configured to provide electrical power. Individual power supplies are managed in this arrangement by a master FBC 90 (may be designated by operator as master control). The FBC can be in communication with engine driven generators 90a, 90b, 90c and FBC 90d (for controlling a fuel cell 91d) and FBC 90e (for controlling battery storage system 91e). A load 39 arranged in a plurality of different associated electrical power consumption points 20, 35, 31, 42, is shown. ECU 20 is a single appliance managed by a single DDD 5. Tactical command post 35 is a plurality of appliance loads managed by a single DDD 5a. Field kitchen 31 contains a plurality of appliances managed by a single DDD 5b. Tent 42 is a plurality of appliances managed by a single DDD 5c. Power supply 97 may be adjusted by the request for operation of any DDD and/or by the master FBC 90.

Adjustment of power supply 97 by ECU 20 and permission to start may be implemented responsive to monitoring by the master FBC 90. A new appliance load start request with accompanying energy profile requirements of at least one appliance load may be implemented by the operator or thermostat (not shown), monitored by the master FBC 90. In another embodiment, a characteristic (most efficient electrical energy source to use) of power supply 97, electrical energy and reserve capacity is monitored for best fuel efficiency. In still another embodiment, the master FBC may be configured to communicate with a variable speed generator thereby controlling the engine speed or other parameters as a single energy supply or coupled with a plurality of energy supplies.

The present disclosure provides exemplary collective monitoring operations of DDD managed appliances consuming electrical energy and the analysis of collective future load data profiles of appliances in a non-operating (deactivated) condition connected to micro-grid 150 to reduce reserve capacity. In addition, the present disclosure provides exemplary coupled non-running possible appliance load energy profiles representative of a single load or combinations of appliances represented as one load profile. This collective information in one aspect of the disclosure is used for initial set up and pre-operation check out and balancing (of reserve power, and energy conversion type) of a mobile military micro-grid.

Until now the mobile military micro-grid was designed using bills of material listing all major appliances required and "fudge" factors based on prior lessons learned to select generator size and quantity to provide sufficient reserve electrical energy to operate electrical energy to the appliances or loads of the system. As mentioned previously, mobile generator on line load sharing capacity is consistently sized larger than needed. In many fielded camps, a more efficient use of fuel would be in parallel supply of a larger micro-grid. However, this is not done due to the inability of controlling all the various configurations of the camp, growth or down sizing of the camp, and the fear of not having sufficient energy reserves at high priority designations. The following exemplary illustration provides an in-depth understanding of energy supply and demand during a diurnal cycle of a military mobile-fielded micro-grid, the energy distribution flexibility during micro-grid setup, fuel-efficient operation of energy producing assets, and real time data of connected supply and consumption assets.

Again with reference to FIG. 3, during initial micro-grid 150 setup, the FBC master 90 is energized through micro-grid 150 by the electrical output of any one or more energy creating sources connected to the micro-grid 150 (e.g., engine battery of generator, fuel cell, battery and capacitors, etc. as discussed previously). All controllers of power supply 97 communicate by network 6, independent of the state of operation of the respective coupled energy source. When queried by the operator, master FBC 90, using network 6, pings power supply 97 for non-volatile data for efficient generated energy fuel use, including but not limited to type of energy device (e.g., diesel engine, battery storage, fuel cell, ultra-capacitor storage, micro turbine (not shown) wind turbine, (not shown) solar (not shown, waste to energy (not shown) bio-mass (not shown, vehicle (not shown) self powered heater (not shown)). The data collected enables the master FBC to continually evaluate the reserve or excess energy and type of energy conversion being used to supply the base load of power supply 97, to maintain a maximum power output efficiency with lowest fuel use created reserve capacity point through selection and de-selection of each respective energy device established on the base load, retaining profile data of what those load profiles are, and responding to any future call for operational loads explained further below.

In another aspect of the disclosure, master FBC 90 is energized through micro-grid 150 by the electrical output of any energy-creating source connected to micro-grid 150. In one embodiment of the disclosure, fuel cell 91*d* supplies electrical energy to micro-grid 150. All of combined loads 39 electrically communicate by network 6, independent of state of operation of the respective coupled appliance or DDD coupled group of appliances. When queried by the operator, master FBC 90, using network 6, pings the individual loads or the combined load 39 for consumption profile of appliance (e.g. ECU, washer (not shown) dryer (not shown) fuel fired heater (not shown) resistive heater (not shown) field kitchen 31, command post 35, and/or tent 42).

The data stored in non-volatile memory provided by the respective DDD may include and is not limited to, energy profile data of consumption of a single appliance or energy profile data of energy consumption of a group of appliances. The energy profile can include resistive (e.g. heaters and incandescent lights), inductive (e.g. motors and transformers), capacitive (e.g. capacitors, wiring, cable). This specific information is provided by the respective coupled DDDs. Furthermore, the operator can reconfigure equipment or change the size of individual field micro-grids using supply and consumption profile data information of power supply 97, and load 39, and/or energy dynamics. Knowing the spike or inrush loads separate from the run or nominal loads, in advance or during use, provides for ease of selecting energy supply type, upsizing or downsizing of power supply assets and optimum combinations for base load and reserve capacity sizing, relocation of power producing assets (e.g., balancing power producing assets to other micro-grids within the camp), and/or appliance loads physically or by power cables to consume energy from another micro-grid within the camp or connect additional island micro-grids together for best fuel efficiency of reserve power.

The above fielded micro-grid system setup methodology for analysis, monitoring and control before energizing all loads provides the operator a smart analysis of actual connected inrush and operational loads using power supply and appliance specific energy profile information. The following explains the actual inter-operation of power supply 97 controllers and load 39, delays and control thereof in one exemplary embodiment.

Again, with continued reference to FIG. 3, the master FBC 90 is energized through micro-grid 150, by mobile generator 91*a* (which in this example has a 30 kW capacity). The operator may select the master FBC 90, to operate power supply 97, automatically in response to load 39. Micro-grid load (for this example) has been less than ten kW for a preset time (time threshold input selected by the operator). Based on the FBC's energy algorithm, the FBC 90 "looks" for a more efficient electrical energy source combination and pings power supply 97 for previously defined parameters stored in power supply 97 FBCs so as to perform a "best efficiency" analysis. All connected energy supply controllers respond with respective information of their coupled energy supplies. The master FBC 90 computes electrical energy output needed for load verses fuel efficiency at the level of energy output and other previously defined parameters. By way of example, fuel cell controller 90*d* may be selected as the most efficient energy supply. As such, it is given a start up request after communication of stored and present state of appliance operation. The fuel cell 91*c* synchronizes to micro-grid 150, and is instructed to connect to micro-grid 150 (for load sharing) by the master FBC 90. Thereafter, the master FBC may disconnect mobile generator 91*a* from micro-grid 150 if no longer required to supply the current load.

In another aspect, the micro-grid 150, having energy supplied by fuel cell 91*d*, as monitored by master FBC 90, may receive a request for start from DDD 5, for operation of the ECU 20. This transmitted start request information contains embedded information of ECU 20, such as the power consumption profile for start and run (see FIG. 9). The power consumption profile stored information may contain serial numbers, model numbers, resistive, inductive, capacitive, type of consumption, specific inrush current, power factor, status update rate and operational electrical energy profile over time in order to better select the efficient use of available electrical energy producing assets of power supply 97. This energy consumption profile information may be pre-test actual test chamber, or lab-testing data embedded into respective DDD memory during manufacturing.

At this point, the master FBC 90 analyzes the request for start operation of the ECU 20 and its power consumption profile. In this example, insufficient inrush energy is available to operate ECU 20. Thus, DDD 5 is instructed by the master controller to delay starting of ECU 20, until sufficient electrical energy is available for the start and operation of ECU 20 (e.g. fuel cell 91*d*, 10 kW output insufficient to supply inrush energy profile). The inrush energy required and the run energy required for operation of ECU 20 is thus managed by the master FBC 90 software as a plurality of individual energy amplitudes (e.g. compressor and related air moving motors inrush current and after inrush load running state of operation and moments in time). Based on this, the master controller FBC 90 determines additional electrical energy is required from power supply 97, and pings and receives previously defined energy profiles stored from all power supply 97 controllers for performing a "best efficiency" analysis, (e.g. least amount of fuel use to supply electrical energy output required for inrush load and subsequent run load). If ample energy is potentially available from the power supply 97, the respective individual power source will be activated in order to accommodate the inrush and run energy needs of the ECU 20.

It should be noted that the master controller FBC may include additional sensors responsive to such conditions, but not limited to, atmospheric pressure, and ambient temperature, to de-rate engine driven generator output and efficiency performance, sun light intensity for solar loading effect of heated or cooled shelters, (as temperature increases air conditioner operational loading increases), and/or GPS regional location for look up in non-volatile memory pre-loaded climatic data (data used in conjunction with power profiles and consumption profiles for adjusting master controller calculated loads and frequency of appliance cycling). The master controller in certain embodiments selectively adjusts one or more of the power supply profile data, the micro-grid load data, and/or the load profile based in whole or in part on at least environmental information relating to the environmental condition of the micro-grid and/or on location information relating to the geographical location of the micro-grid. In addition, the master controller FBC may enable ease of set up and operation of micro-grid by using regional diurnal historical climatic conditions for efficient engine efficiency rating and solar output effect to the base load and reserve energy supply and consumption of micro-grid configurations. During operation of micro-grid, energy profile of each energy producer coupled to power supply 97 and consumption profiles of load 39 can be factored by FBC master 90 by specific regional climatic data factors (e.g., a higher current draw with the coupled load 39). For example, energy generation combination of generator 91a (30 kW), generator 91b (10 kW), and generator 91c (5 Kw) could be recommended for the energy supply of the coupled appliances. Alternatively, if power supply 97 is not capable of producing adequate power and no other power is available, fuel efficient energy balancing may require, for example, movement of the ECUs or tent 42, to another micro-grid or such may be disconnected from use (load deactivation).

In one aspect of the disclosure fuel-efficient electrical energy required for inrush and operation may be supplied from a plurality of available energy producers of power supply 97. In this example run energy required for ECU operation 20 is supplied by the most efficient energy producer of a additional 4 kW load (e.g. mobile generator 91c, 5 kW) but mobile generator 91c and fuel cell 91d have insufficient energy capacity to supply DDD 5 including the transmitted inrush current of coupled ECU 20 appliance. FBC master controller 90 uses energy profiles of power supply 97, including the energy output profile of battery storage and capacitors 91e, supplied by FBC 90e, indicating sufficient electrical energy from battery and capacitors 91e to supply electrical energy for inrush load of ECU 20. Generator control master 90 instructs ECU 20 to wait, instructs energy storage system controller 90e to synchronize battery and capacitors 91e to micro-grid 150 (energy storage system batteries and capacitors contain necessary components such as inverters, battery charger, power management controller and disconnect switches for grid tie in) connect to micro-grid 150, to supply electrical inrush energy needed for inrush energy of ECU 20 (subsequent run energy is supplied by mobile generator 91c), and then ECU 20 is given permission to start. In one aspect of the disclosure FBC master controller 90 controls the operational (activation) state and stored energy level of a battery storage system by the monitoring and control of charge levels and energy distribution control.

The algorithm parameters of the master controller FBC select and balance two or more available electrical power supplies, applying the most efficient available combination of supply energy and wait time of consumption (e.g. time factor to start the generator engine, fuel cell, and or pre-connection phase synchronization wait time) for highest fuel efficiency of engine driven electrical energy producers. For example, the battery and capacitors energy storage may be connected or disconnected to the micro-grid for inrush energy supply, power factor correction or dissipation of stored energy from renewable energy sources, and various other electrical energy inputs. In addition, the battery and capacitors 91e may be connected to micro-grid 150 by FBC master 90 to increase the base load (e.g. energy used for appliance inrush current and/or grid peaking as examples) for higher fuel efficiency of power supply 97.

Figure 4:
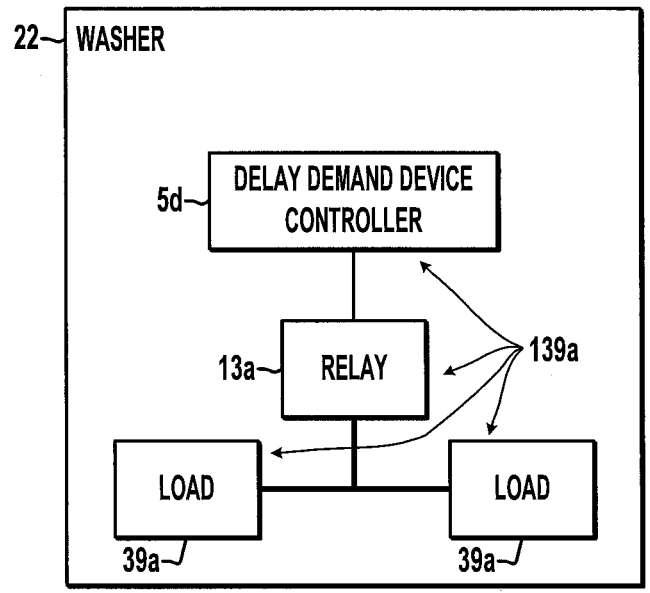
FIG. 4 is a system diagram illustrating a washer type appliance of the micro grid system of FIG. 1, having an integrated delay demand device controller.

With reference now to FIG. 4, an appliance of the micro-grid is depicted as a clothes washer 22. The exemplary clothes washer 22 may include a demand delay device controller DDD 5d, a relay 13a, a heating element 39a, and an agitator motor 39b. The heating element may heat water used in an associated compartment (not shown) of clothes washer 22 that is configured to receive and wash clothes. Agitator motor 39b is configured to oscillate between different rotational directions or other wise agitate clothes within the associated compartment during wash and/or rinse operations. Control circuitry DDD 5d, heating element 39a, and agitator motor 39b are exemplary associated loads 139a of clothes washer 22 in the depicted embodiment.

In one configuration, a request for start of the clothes washer 22 (FIG. 4), the energy consumption profile (e.g. resistive, inductive, capacitive), and the associated consumption energy levels are communicated to power supply master FBC 90 (FIG. 3). Transmitted data may include electrical energy profile of type of wash cycle selected, total time of selected wash cycle, selected water temperature, energy inrush load, operational energy levels and related energy requirements (e.g. solenoids, operator display as an example) to receive sufficient energy without cessation throughout the selected wash cycle. Visual or audible information (not shown) may be provided to alert the operator when insufficient power is available during initial start request. This operator information may include time to wait for washer 22 to begin (i.e. while power supply 97, FIG. 3, selects type or size of electrical energy for energy consumption profile of washer 22). In another exemplary power management operation, control circuitry DDD 5d, in communication with FBC master 90 (FIG. 3) and clothes washer 22, may communicate timing functions such as wash cycle time to water fill based on selected water level. Energy required to provide time to water fill may be available but additional energy needed for inrush energy is not. The master controller FBC 90 may give permission to water fill based on communicated time to fill and known time value of acquiring, or changing type or size of power supply.

Figure 5:
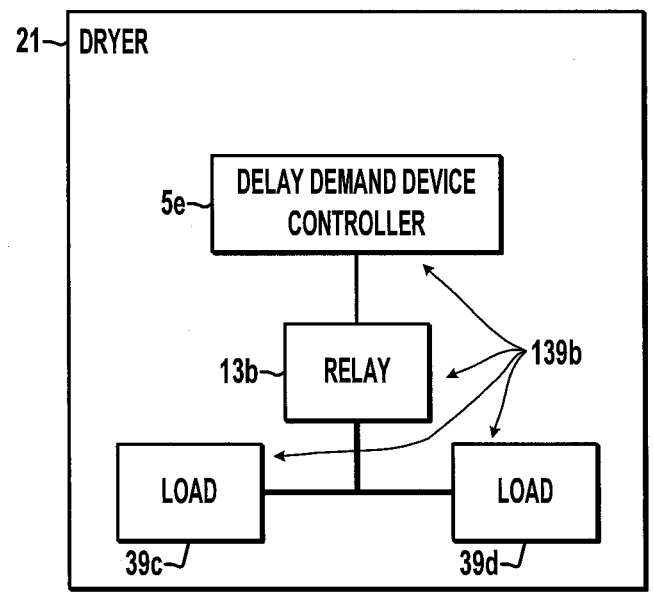
FIG. 5 is a system diagram illustrating a dryer type appliance of the micro grid system of FIG. 1, having an integrated delay demand device controller.

Now referring to FIG. 5, an appliance of the micro-grid is arranged as a clothes dryer 21, where the master controller is operative for at least one received load activation request to give permission to activate a partial requested load and to delay permission for activation for a remainder of the requested load until the micro-grid power system is rebalanced. The clothes dryer 21 may include control circuitry DDD 5e, a relay 13b, a heating element 39c, and a tumbler motor 39d. Heating element 39c is configured in one embodiment to heat an associated compartment (not shown) of clothes dryer 21. Tumbler motor 39d is configured to spin clothes within the associated compartment during drying operations. Control circuitry DDD 5e, heating element 39c, and tumbler motor 39d, comprise exemplary associated loads 139b of clothes dryer 21 in the depicted embodiment.

In one configuration, a request for start of clothes dryer 21, the energy consumption profile (e.g. resistive, inductive, and capacitive) and associated consumption levels is communicated to power supply master FBC. Similar to the washer discussed previously, transmitted data can include electrical energy profile, type of cycle selected, total time of selected dry cycle, selected air temperature, energy inrush load, operational energy levels and related energy requirements (e.g. operator display and solenoids as an example) to receive sufficient energy without cessation throughout the selected dry cycle. Again, visual or audible (not shown) information may be provided to alert the operator when insufficient power is available during initial start request. This operator information may include actual time to wait for dryer 21 to begin operation (e.g. as power supply 97, FIG. 3, selects type or size of electrical energy for energy consumption profile of dryer 21). In other exemplary power management operations, control circuitry DDD in communication with the master FBC, may communicate timing functions such as temperature selection and dry cycle time. Energy required to run the tumbler motor may be available but additional energy needed for resistive heating is not. Thus, the master controller FBC may give permission to control circuitry DDD to operate tumbler motor and may delay operation of heating elements based on communicated time value of acquiring or changing type or size of power supply to energize heating element.

Figure 6:
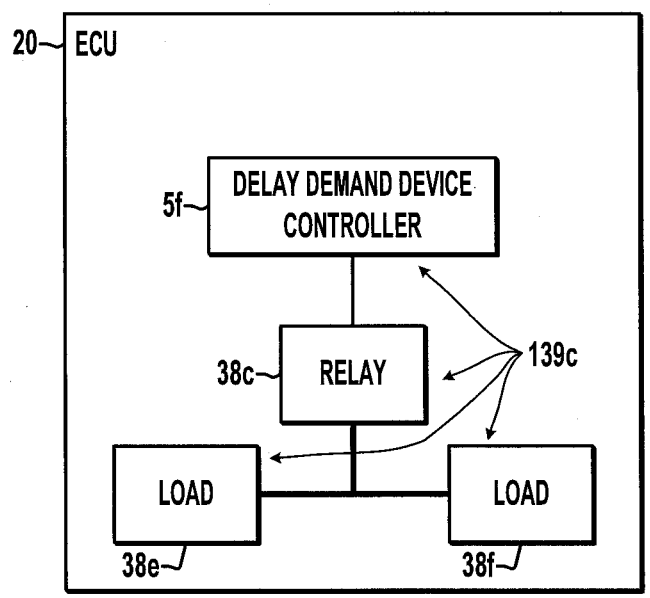
FIG. 6 is a system diagram illustrating an environmental control unit appliance of the micro grid system of FIG. 2, illustrating an integrated delay demand device controller for controlling a plurality of sub-loads.

With reference to FIG. 6, an appliance of the micro-grid arranged as an ECU 20 is shown. The ECU 20 may include control circuitry DDD 5f, a relay 13c, a compressor 39e, and a blower 39f. Compressor 39e is configured to compress a working fluid (not shown) and blower 39f is configured to provide air movement through associated heat exchangers (not shown) during ECU operation. Control circuitry DDD 5f, compressor 39e, and blower 39f, comprise exemplary associated loads 139c of ECU 20, in the depicted embodiment. In one configuration, request for start of ECU 20, energy consumption profile (e.g. resistive, inductive, capacitive) and associated consumption profile (FIG. 9, as example) is communicated to power supply master FBC master controller 90 (FIG. 3). Here, transmitted data may include electrical energy profile of, heat or cooling mode selected, set point of thermostat and temperature of air to be conditioned (not shown), energy inrush load profile (FIG. 9, as example) of selected mode of operation, operational energy levels, and related energy requirements (e.g. operator display, additional air movers, condensate pump as an example) to receive sufficient energy without cessation throughout the selected mode of operation. Visual or audible information (not shown) may be provided to the operator to alert the operator when insufficient power is available for initial start request. This operator information may include time to wait for ECU 20 to begin operation (i.e., while power supply 97, FIG. 3, selects type or size of electrical energy for energy consumption profile of ECU 20). In addition, control circuitry DDD 5f can be configured to be in communication with the master FBC so as to communicate the selected mode of operation (such as heating, cooling, or ventilation). Based on mode selected, energy required to operate associated load 139c may be available but additional energy needed for resistive heating (not shown) or compressor 39e may not be available. By way of example, the master FBC 90 may give permission to control circuitry DDD 5e to operate blower 29f, and may delay operation of heating elements (not shown) or compressor 39e, based on communicated time value of acquiring or changing type or size of power supply to energize heating element or compressor 39e.

Figure 7:
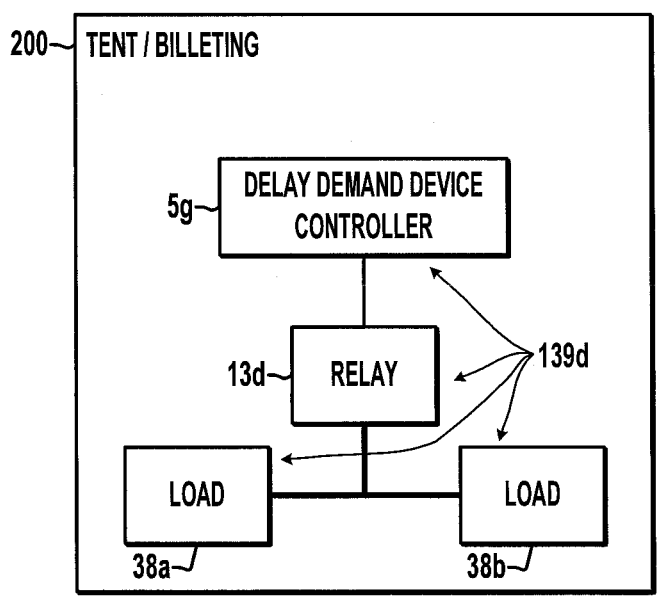
FIG. 7 is a system diagram illustrating a tent building type load of the micro grid system of FIG. 2, including a delay demand device controller for controlling a plurality of sub-loads.

Now referring to FIG. 7, another load of the micro-grid is provided as a tent 200. The tent 200 can be arranged as sleeping quarters or billeting. The tent 200 may include a control circuitry DDD 5g, a relay 13c, a first in-tent power panel 38a, and a second in-tent power panel 38b. The first in-tent power panel 38a can be configured in one embodiment to supply electrical energy to high current tent loads (e.g. televisions, hair dryers, toasters, personnel fans) within tent 200. The second in-tent power panel 38b can be configured to provide low current electrical energy (lighting, personnel battery charging, electric blankets, and radios) to the remaining individual sleeping spaces within tent 200, floor space. Control circuitry DDD 5g, in-tent power panel 38a, and in-tent power panel 38b, comprise exemplary associated loads 139d of tent 200, in the depicted embodiment.

In one configuration, in-tent power panel 38a and 38b, respective circuit breaker capacity of typical sleeping quarters tent 200, and electrical load energy consumption profile (e.g. resistive, inductive, capacitive) are stored in non-volatile memory of control circuitry DDD 5g for data communication with master controller FBC 90 (FIG. 3). In the current art it is customary to leave the generator tent energy supply assets in operation throughout a diurnal cycle. Much of the time the tent is unoccupied or occupants are at sleep. Maintaining unneeded power supply 97 (FIG. 3) at capacity during these times wastes fuel and increases engine generator maintenance. Thus, an on/off switch (not shown) can be located within tent 200 that signals request for power for in-tent power panel 38a-38b by relay 13d. Alternately, a motion control sensor (not shown) can be located within tent 200 that senses occupancy causing control circuitry DDD 5g to signal request for power. If sufficient electrical energy is available from the power supply, control circuitry DDD 5g connects the in-tent power panel 38a-38b by relay 13d to the micro-grid. Additional transmitted data may include electrical energy profile of, sleeping quarters energy load, operational energy levels, and related energy requirements (e.g. televisions, hair dryers, personnel fans as an example) to receive sufficient energy without cessation throughout use of sleeping quarters.

In another embodiment, the power consumption profile may have a plurality of automatic or operator selected modes of user power profiles. A first example of a usage energy profile is during non-sleeping occupancy and a second example of an energy profile for periods of sleeping. The ability to communicate the anticipated load profile has the fuel saving advantage of reducing power supply 97 unused but available capacity on standby (spinning reserve). Visual or audible information may be provided to the operator to alert the operator when insufficient power is available for initial tent 200 energy profile start request. This operator information may include time to wait for tent 200, power to be connected, (e.g. as power supply 97, FIG. 3, selects type or size of generator or stored electrical energy to best fit energy consumption profile of tent 200). The DDDs 5 and/or the master controller 90 in certain embodiments may be operative to respond to sensor control inputs such as motion sensors from a tent load 91. For instance, tent control circuitry 5g (FIG. 7) may be coupled with a motion or similar type sensor to automatically change the delay control circuitry 5g permission for electrical energy from an unoccupied to an occupancy load level.

In other exemplary power management operations, control circuitry 5f of tent 200 that is in communication with master FBC may communicate an operator selected mode of operation (such as not in use, occupied, or sleeping). Based on selected mode of operation, tent power levels may be available for sleeping but additional energy needed for waking up or evening relaxation is not available at all times (e.g. reducing reserve capacity). The master controller FBC may give permission to control circuitry 5e to operate in-tent power panel 38b, and may delay operation of in-tent power panel 38a based on communicated time value of acquiring or changing type or size of power supply to fully energize tent 200 when mode of tent operation is changed. In other exemplary power management operations, tent 200 control circuitry 5g may be coupled with a motion or similar type sensor to automatically change the delay control circuitry 5g permission for electrical energy from an unoccupied to an occupancy load level. In some cases low current levels or energy are needed to remain on for personnel battle field battery charging. An alternate embodiments where some electrical energy is needed to be always on, delay control circuitry 5g can be configured with a energy on over-ride selector switch to lock on specific tent supply power panels or outlets.

Figure 8:
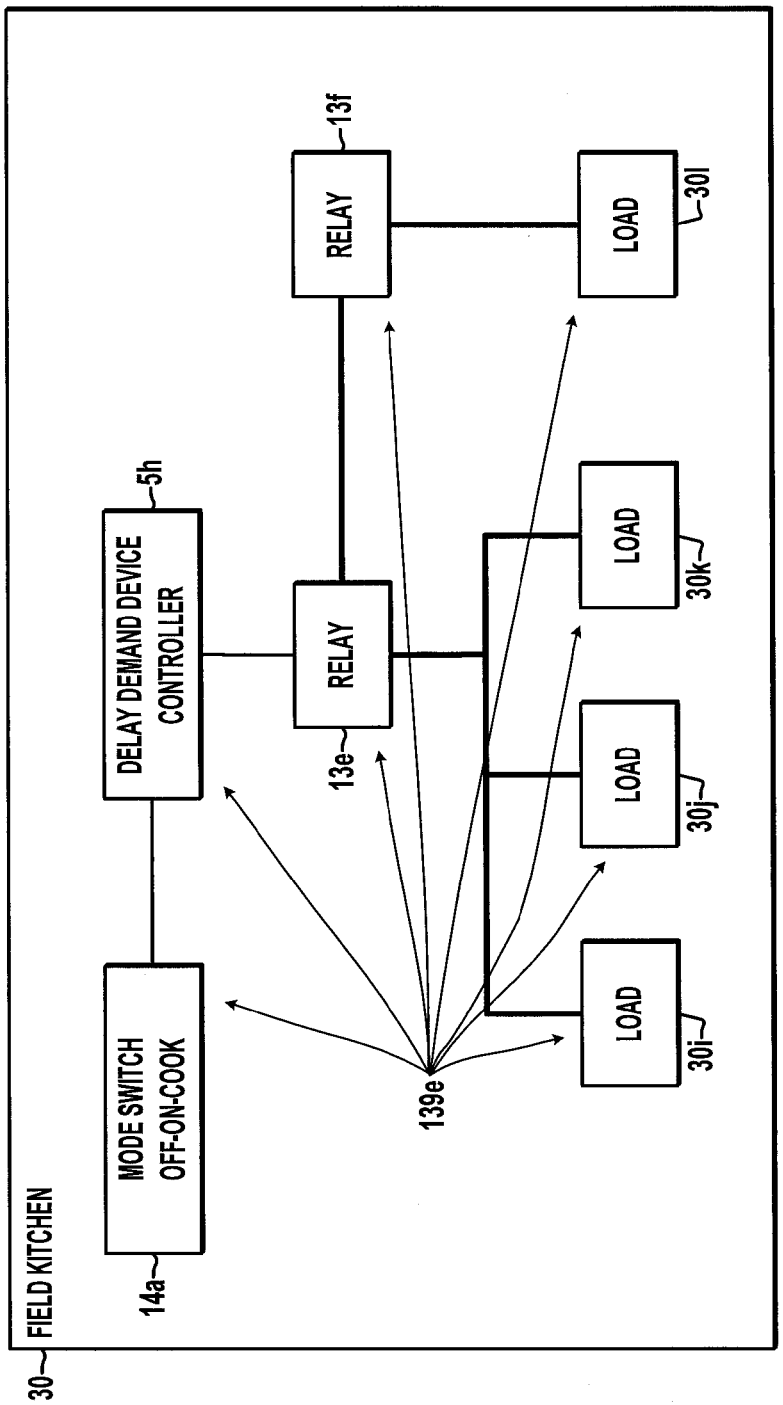
FIG. 8 is an enlarged system diagram illustrating a field kitchen load of the micro grid system of FIG. 2, illustrating a mode switch, an integrated delay demand device controller, and a plurality of sub-loads.

Now with reference to FIG. 8, yet another load that can be associated with the micro-grid of the present disclosure involves that of a field kitchen 30. The kitchen 30 can be arranged as a plurality of food storage, preparation, and sanitization appliances as shown. The kitchen 30 may include a mode switch 14a, a DDD control circuitry 5h, a high current relay 13e, a low current relay 13f, an oven 39i, a steamer 39j, a griddle 39k, and a non cooking load 39l. The DDD of the kitchen is configured to provide energy profile data of the loads within field kitchen 30. The high current relay 13e can be configured to provide high current electrical energy while the low current relay 13f is configured to supply non-cooking low current electrical energy (e.g. lighting, water heating for sanitization sink, refrigerated storage, and freeze protection of water lines). The DDD control circuitry 5h, mode switch 14a, relay 13e, relay 13f, oven 39i, steamer 39j, griddle 39k, and non cooking loads 39l, comprise exemplary associated loads 139e of field kitchen 30 in the depicted embodiment.

With continued reference to FIG. 8, and by way of example only, the mode switch 14a can be placed to an on position. Load profile data associated with non-cooking relay 13f is communicated to the master FBC by control circuitry 5h. The non cooking request for power may be defined and profiled through lab load testing and can be stored in non-volatile memory of control circuitry 5h. Thereafter, the energy consumption profile (e.g. resistive, inductive, and/or capacitive) and associated consumption levels are analyzed by power supply master controller FBC via an algorithm for fuel efficient selection of supply power assets. When the mode switch 14a is positioned to cook, load profile data associated with cooking relay 13e is communicated to the master FBC by control circuitry 5h. The cooking request power profile can be pre-determined via lab load testing and can be stored in non volatile memory of control circuitry 5h for communication with the controller master FBC. Thereafter, the power consumption profile (e.g. resistive, inductive, capacitance) and associated consumption levels can be analyzed by the power supply master FCB via algorithm for the fuel efficient selection of supply power assets. Of course, the sub-loads 139e may be selectively and independently or dependently coupled according to a plurality of respective operational modes. Such modes may include on or off state of individual load operation. In addition respective operational start and on loads have been profiled and stored in non-volatile memory of control circuitry 5h. The control circuitry 5h transmits the associated defined load profile of the individual and/or the collective equipment respective to associated relay for analysis of best power supply energy source configuration.

With reference now to FIG. 9, a graphical diagram is provided depicting two different fielded models of 60 KBtu ECUs used in accordance with one or more embodiments of the present disclosure. An energy profile 400 provides a clear understanding of the power consumption differences of a base load and required reserve capacity. A first profile ECU1 requires significantly more inrush power and consist of many inrush cycles to maintain the thermostat setting while a second profile ECU2 (after the initial inrush) maintains the thermostat setting with very little inrush power. Though trend 1 and trend 2 show consumption when averaged as very similar, nonetheless a smaller generator could be employed to operate ECU2 due to the lower inrush. In addition, an energy storage system could be selected to provide the inrush of ECU1 and thereby operating on the same size generator as ECU2. It is the pre-communicated energy consumption profile, the monitoring, and the pre-communicated power supply profiles that provide the ability to select the most energy efficient combination of power supplies.

With continued reference to FIG. 9, the energy profile 400 depicts two different designed ECUs consisting of a compressor, air blower, condenser fan, and related loads. The first energy profile ECU1 depicts electrical energy requirement to start and operate from an off state 405, an inrush state 407, a run state 406, and a run with compressor off state 408. The second energy profile ECU2 similarly depicts electrical energy requirement to start and operate from an off state 405, an inrush state 420, and a run state 421.

The DDD control circuitry 5f (FIG. 6) of the ECU may include random access memory, read only memory, flash memory, and various combinations of these types of memory used to transmit associated load 139c profile (e.g. in this example energy profile ECU1 or ECU2,) to the master controller FBC. The DDD may include a transceiver. The transceiver may utilize wireless or wired communication techniques for such communication. Similarly, the FBC master controller may include a processor and random access memory, read only memory, flash memory, and various combinations of these types of memory used to receive associated load 139c profile. The master controller FBC may also include a transceiver that may utilize wireless or wired communication techniques for such communication such that the FBC master controller can issue command and control signals to supply 97 and Load 39 (FIG. 3).

Figure 10:
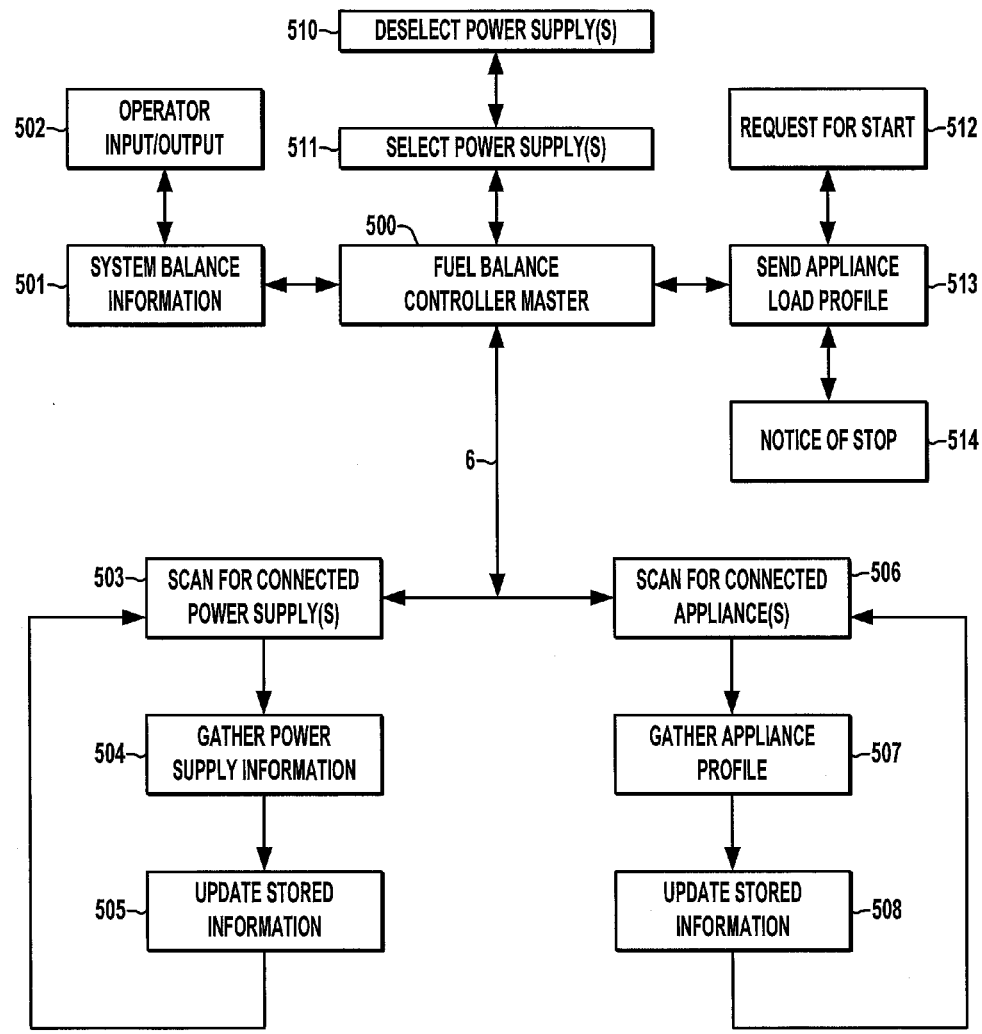
FIG. 10 is a flow chart diagram illustrating the method of operation of one embodiment of a micro power system including a master fuel balance controller (FBC), according to the present disclosure.

Now with reference to FIG. 10, an exemplary configuration and method of monitoring micro-grid appliances and power supplies is provided. Here, a master FBC 500 may comprise a hub for operation of a plurality of power supply and appliance loads. This hub configuration uses data network 6 to provide continuous updating and fuel-efficient refinement of power supply selection in response to the monitoring. Operator input/output 502 provides the user interface for input settings, preoperational supply and load information for pre use adjustment of power supplies and grid loads. System balance information 501 may comprise random access memory, read only memory, flash memory, and various combinations of these types of memory are used to store associated FBC, user, and/or operational computational information. A request for start 512 may initiate a send appliance load profile 513 to the master FBC 500, to select power supply 511, and/or deselect power supply 510. The FBC master controller 500 continuously queries using data network 6 to scan for connected power supplies 503 and gather power supply information 504. Such information may include base load and what part of base load is registered appliance loads verses non registered (non-operating), reserve capacity, and off line power supply asset type (connected in off state). This information may be refreshed by an update-stored information command 505. The FBC master controller 500 continuously queries using communication 520 to scan for connected appliances 506 and gather power appliance profile 507. Such profile information may include running or non running status. This information may be refreshed by an update-stored information command 508. A notice of stop command 514 may initiate a send appliance load profile 513 to the FBC master controller 500 so as to select power supply 511 and/or deselect power supply 510.

With reference now to FIG. 11, power management information system 600 is shown arranged according to the present disclosure. The system 600 can be configured to depict OEM controller information and the exchange of power supply energy profiles. In accordance with above described examples, the master FBC 500 continually updates power supply profiles for adjustment at different moments of time and from the request of appliance 516 to start or notice of stoppage. The depicted system can be configured to communicate with an OEM power supply control such as fuel cell generator controller 505, generator controller 506, and energy storage controller 507. Each OEM controller may communicate salient characteristics necessary for operation of their respective power supply with FBC 510a-510c. The FBCs 510a-510c may include non-volatile memory containing actual tested performance data taken under various loads and conditions of each coupled power supply.

In accordance with another aspect, power supply data may be stored in a data library accessed by the user selected by the size, type or model of the power supply. This performance data of the specific size, type, or model of power supply may be preloaded in a dedicated FBC (mechanically coupled) or uploaded to a non-dedicated FBC for upgrading fielded power supplies. The FBC 510a communicates with fuel cell generator 505. Real time information such as fuel cell running/stopped, on line/off line, voltage, wattage, may be accessed from fuel cell generator controller 505 by FBC 510a. The FBC 510a may contain in memory in addition to actual performance test data, additional criteria such as start up time to rated power, fuel cell power efficiency profile, inverter AC output profile and an overall energy profile curve. This data is monitored and analyzed by the master FBC 500 at different moments of time to implement power supply size, type, or model adjustment. In addition, the monitoring of the master FBC 500 may be triggered by the addition or deletion of an available power supply. The change in availability, size, type or model may implement a change in power supply configuration even though the consumption value has not changed.

The FBC 510b communicates with generator controller 506 and may access information from generator controller 506 (such as engine running/stopped, on line/off line, fuel level, voltages and current levels). The ability to access and store OEM controller operational data for computation reduces the cost and complexity of the FBC 510b. In addition, the FBC 510b can be configured to retain (in memory) additional characteristics used for the computation of best fuel usage power supply selection based upon micro-grid base load and permission to start energy profiles. The generator tested energy profile data can include start up time to rated power, torque/energy output efficiency, continuous output maximum, and momentary peak output.

With continued reference to FIG. 11, solar energy 510 and wind energy 511 power can be coupled with energy storage batteries and capacitors energy storage controller 507 can provide related energy management of the storage and capacitor system. The energy storage controller 507 may be in communication with the FBC 510c. For example, the FBC 510c may communicate with energy storage controller 507 with regard to capacitor charge, charging level, state of charge, and additional battery storage operational data.

In some cases the batteries and capacitor may be the only energy supply operating the micro-grid. The FBC 510c in communication with energy storage controller 507 may sense through the monitoring of energy storage controller 507 the battery energy level decreasing in capacity and signal a request for start providing energy consumption profile for recharging of batteries and capacitors. The present load being supplied, and the request for the additional battery charging load, are analyzed by the master FBC 500 one embodiment for the best fuel-efficient power supply reconfiguration. When in a full recharge state, a notice of shut off by FBC 510c is received by master FBC 500 for best fuel-efficient power supply configuration.

In the prior example a power supply requested recharge energy due to the battery energy storage level becoming insufficient to continue supplying the load. The example illustrates the monitoring and adjusting within power supplies for power supplies without an increase in load but a decrease in stored energy. This power supply adjustment without load change may also be implemented when power is supplied by a single mobile generator and the fuel reserve reaches a pre-determined level signaling FBC 500 to select a replacement power supply for shut down and maintenance of the low fuel generator.

With continued reference to FIG. 11, DDD 515 may receive a request for start from appliance 516 and communicates a request for start with FBC master controller 500. The FBC master controller 500 may request appliance 516 energy consumption profiles that may reside in the DDD memory. Energy consumption characteristics and additional operational aspects such as ambient temperature and altitude may be monitored and be included with the energy profile of appliance 516. This future load is analyzed with data supplied by all FBC energy supplies for the best fuel-efficient power supply configuration.

Figure 12:
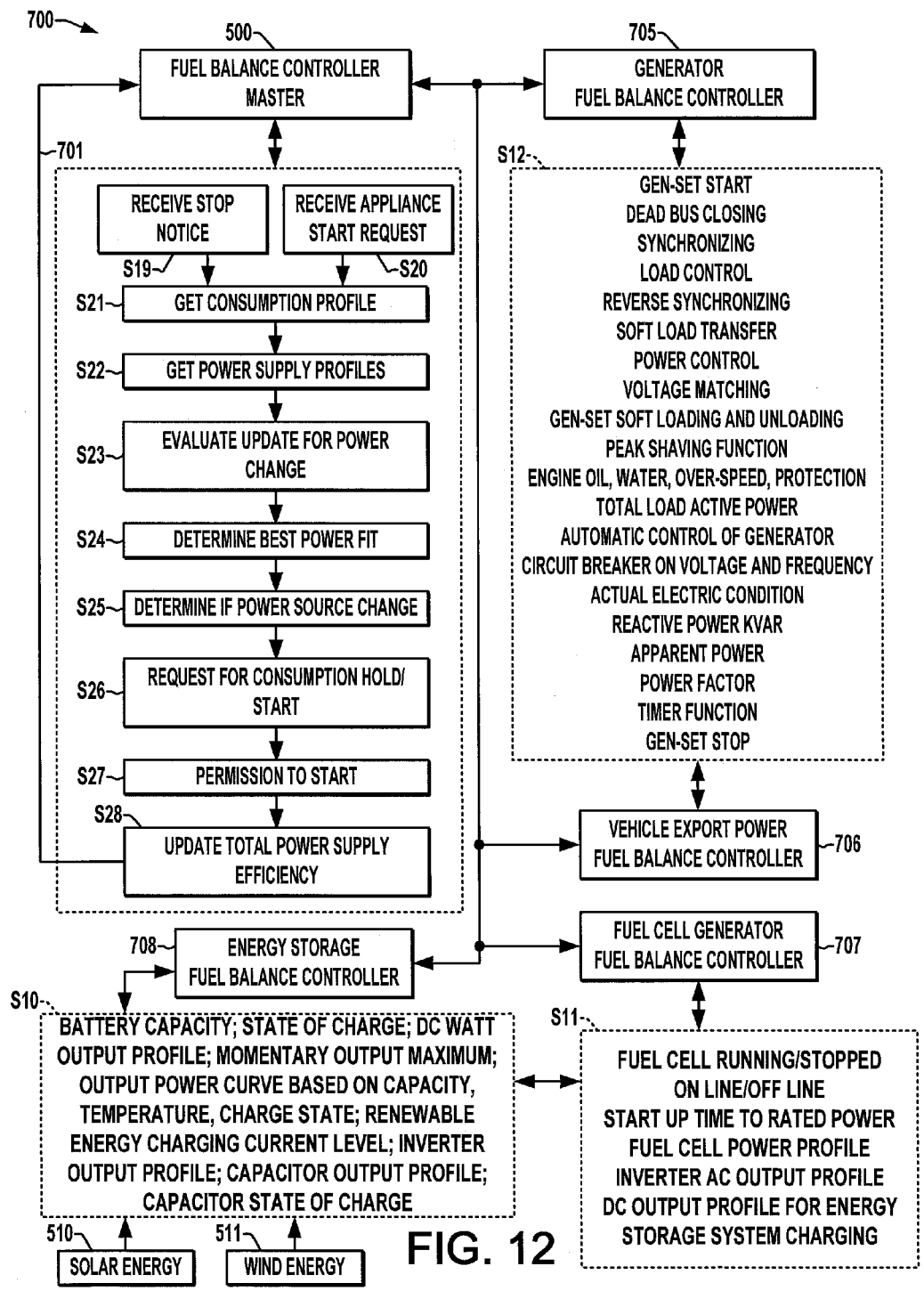
FIG. 12 is a flow chart illustrating the control method performed by the master FBC of FIGS. 10 and 11.

With reference now to FIG. 12, an exemplary methodology performed by the master FBC 500 is shown with respect to a power supply information exchange 700, illustrating the monitoring and adjusting of a plurality of power supply types connected, removed, or recently attached to a mobile military micro-grid. Other methods are possible including more, less, or alternative steps. It should be noted that these steps are not necessarily all performed and it is not necessary for the step to be performed in the sequence shown. Additional activities such as re-simulation and data modification occur as the analysis proceeds and some iteration between the various steps may be required.

As discussed above, the ability to select the most fuel efficient power supply or combination of power supplies is from the gathering of power supply profile data (e.g. pre-tested profile data) integrated with static (not running) or dynamic (running) power supply and micro-grid load data that may reside in the FBC and communicated with the master FBC for configuration change execution. By an additional load request or appliance cessation notice triggering the exchange of appliance load data (e.g. pre-tested profile data) used by the FBC master algorithm for the rebalancing if required.

With continued reference to FIG. 12, the master FBC 500, at appliance start request step S20, enters a state to rebalance power supply assets in relationship to the new load profile, gathering appliance consumption profile at step S21, and power supply profiles at step S22. In the illustrated method, the power supply profile includes pre-tested operational data and data values of present operation step S12, S11, S10. Appliance energy profile (FIG. 9) can be calculated with retrieved associated power supply data step S23. The master controller FBC 500 is configured to provide a desired amount of fuel-efficient electrical energy to the associated start request S20. At step S24, the best fuel-efficient combination to provide the load is determined. It may also be determined in Step S24 that the present power supply configuration is the most fuel efficient, thus proceeding to permission to start step S27, triggered by a running state signal from respective appliance (not shown). Finally, energy supply efficiency is updated S28.

Furthermore, and with continued reference to FIG. 12, at appliance stop notice step S19, the master FBC 500 enters a state to rebalance power supply assets in relationship to the lost load, gathering appliance consumption profile at step S21, and power supply profiles at step S22. The power supply profiles may include pre-tested operational data and data values of present operation step S12, S11, S10. The appliance energy profile (FIG. 9) can be calculated and associated power supply data is retrieved in step S23. Control circuitry master FBC 500, is configured to provide a desired amount of fuel-efficient electrical energy to the appliance stop notice S19. At step S24, the best fuel-efficient combination is determined. Step S24 may also determine that the present power supply configuration is the most fuel efficient thus causing the FBC to proceed to update the total power supply efficiency step S28 or change power supply configuration at step S25.

With further reference to FIG. 12, the FBC 500, through the monitoring of power supplies determines that a power supply has been added to the micro-grid. For example, a period of time has elapsed the micro-grid is balanced with available power supplies and the load, master FBC 500, through the monitoring recognizes vehicle export power FBC 706, as a new source. The FBC then proceeds to step S21, then S22, evaluates for power change S23, selects the best fuel efficient change and implements the change step S25, updating to the new supply, consumption, and load. Similarly, the FBC 500, through the monitoring of power supplies determines that a power supply has been removed from the micro-grid. For example, again a period of time has elapsed, the micro-grid is balanced with available power supplies, and the load, master FBC 500, through the monitoring recognizes vehicle export power FBC 706, as a lost source. The FBC would then proceed to step S21, then S22, evaluates for power change S23, selects the best fuel efficient change and implements the change S25, updating to the new supply, consumption, and load.

Thus, several benefits and features have been disclosed related to the disclosure. According to one aspect, an electrical power distribution control method providing electrical energy from a plurality of engine driven generators, applying the electrical energy to a plurality of appliances, providing a plurality of different combinations of engine driven generators corresponding to the lowest amount of fuel usage initiated by data communication, of appliance load profiles, before appliance operation, on request for start up and during operation of a plurality of appliances. Electrical energy distributed through a military fielded micro-grid and network for data transfer.

According to another aspect, control of an electrical power supply of different energy conversion inputs such as diesel, hydrogen, wind, battery, capacitor, solar connected in parallel. Fuel efficiency control method includes providing a plurality of individual power supply selection corresponding to lowest fuel usage providing electrical energy values based on pre-defined energy consumption data communicated before operation. Applying a delay of start time on request for appliance or group of appliance start up when required to initiate a readjustment of type or output capacity of energy power supply. Providing electrical energy and adjusting type of energy conversion to another energy conversion type of available energy different than the initial type of available energy responsive to the communication of a energy profile of appliance or group of appliances connected but not in operation or at notice of appliance or group of appliance shut down. In certain embodiments, moreover, the master controller is operative to rebalance the supply of electrical power to the micro-grid power system by changing an activation state of one or more of the plurality of power supplies based at least partially on an indication of imminent loss of at least one of the power supplies, for example, in response to warnings or other indications that low batteries needing charging or by changing the power supply based on a low fuel warning or other eminent loss of individual power supply such as overheating, or low fuel, even if there is no loading change.

According to another aspect, control of an electrical power supply of different energy conversion inputs such as diesel, fuel cell, wind, battery, capacitor, solar connected in parallel in response to power supply health or ability to sustain load. Power supply control method includes readjustment of power supplies in response to present and/or future condition of power supply with or without load change wherein the supply or part of the supply in response to the monitoring may select different sizes or types of energy supply to maintain supply levels. This readjustment may be initiated from energy storage devises such as battery or capacitors in response to remaining available supply energy, or equipment sensors such as engine over heating, low oil pressure, or low fuel warnings, or may be initiated by the master controller.

According to yet another aspect of the disclosure, a fuel savings control method initiated in response to the monitoring of appliance delay control circuitry embedded energy profile data varies the types or capacity of the power distribution system responsive to the monitoring, operating the power supply at another mode of operation wherein one part of the load such as inrush is supplied by a second amount of electrical energy supply different than the first type of energy supply.

According to still another aspect of the disclosure a fuel savings control method response initiated by the monitoring of appliance delay control circuitry embedded energy profile data and operator selected mode of operation varies the types or capacity of the power distribution system responsive to the monitoring, operating the power supply at another mode of operation wherein one part of the load such as inrush is supplied by a second amount of electrical energy supply different than the first type of energy supply.

According to yet another aspect of the disclosure a fuel savings control method initiated by the monitoring of appliance delay control circuitry embedded energy profile data and operator selected mode of operation varies the types or capacity of the power distribution system responsive to the monitoring, fuel balance controller master delays high energy consumption loads for time to reconfigure power supply types or capacities operating the appliance at another mode of operation wherein one part of the load such as motor inrush is delayed than supplied by a second amount of electrical energy supply different than the first type of energy.

According to another aspect of the disclosure a fuel savings control method initiated by the monitoring of a delay control circuitry embedded energy profile data of a plurality of "light load" appliance types. Providing electrical characteristics of a combined and/or random energy consumption profile.

According to another aspect of the disclosure a fuel savings control method initiated by the monitoring of a delay control circuitry embedded energy profile data of a plurality of "large load" appliance types. Providing electrical characteristics of a combined energy consumption profile corresponding to selected mode of operation.

In accordance with further aspects of the present disclosure, a non-transitory, tangible computer readable medium is provided, such as a computer memory, a memory within a control apparatus (e.g., in a fuel balance controller as described above), a CD-ROM, floppy disk, flash drive, database, server, computer, etc., which has computer executable instructions for performing the above described methods.

The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, processor-executed software, or combinations thereof, which performs the specified function of the described component (i.e., that is functionally equivalent), even though not structurally equivalent to the disclosed structure which performs the function in the illustrated implementations of the invention. In addition, although a particular feature of the disclosure may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

Several exemplary embodiments have thus been described. Modifications and alterations may occur to others upon reading and understanding the preceding detailed description. It is intended that the exemplary embodiments be construed as including all such modifications and alterations insofar as they come within the scope of the appended claims or the equivalents thereof.

The invention claimed is:

1. A stand-alone mobile micro-grid power system disconnected from utility power, comprising:
   at least one mobile load capable of consuming electrical power when activated;
   a plurality of mobile power supplies operatively coupled with the at least one mobile load and with one another to form a mobile micro-grid, the plurality of mobile power supplies comprising:
      at least one mobile non-fuel consuming power supply operatively coupled to provide electrical power to the mobile micro-grid when activated,
      at least one mobile fuel consuming generator operatively coupled to provide electrical power to the mobile micro-grid when activated, and
      at least one mobile energy storage system operative to store electrical energy and operatively coupled to provide electrical power to the mobile micro-grid when activated; and
   a master controller operatively coupled with the plurality of mobile power supplies and with the at least one mobile load, the master controller operative to automatically rebalance the mobile micro-grid by changing an activation state of at least one of the plurality of power supplies, wherein the master controller is operative to:
      obtain power supply profile data from the plurality of power supplies;
      obtain micro-grid load data associated with the at least one mobile load;
      determine a load profile for the mobile micro-grid power system based at least partially on the micro-grid load data;
      determine an active reserve power level for the mobile micro-grid power system based at least partially on the micro-grid load data;
      balance the supply of electrical power to the mobile micro-grid power system by setting an activation state of one or more of the plurality of power supplies based at least partially on the load profile and the active reserve power level for the mobile micro-grid power system;
      receive at least one of a load activation request indicating requested activation of one or more specific electrical loads that are currently deactivated, a load deactivation notification indicating deactivation of one or more specific electrical loads that were previously activated, and an active power supply status change notification indicating a change in a status of a currently active one of the plurality of power supplies;
      based on at least one of a received load activation request, a received load deactivation notification, and a received active power supply status change notification, automatically determine if the supply of electrical power to the mobile micro-grid power system needs to be rebalanced based at least partially on the load profile and the active reserve power level for the mobile micro-grid power system; and
      if needed, to automatically rebalance the supply of electrical power to the mobile micro-grid power system by changing an activation state of one or more of the plurality of power supplies based at least partially on the load profile and the active reserve power level for the mobile micro-grid power system.

2. The mobile micro-grid power system of claim 1, wherein the master controller is integrated into one of the plurality of power supplies.

3. The mobile micro-grid power system of claim 1, wherein the master controller is operative to rebalance the supply of electrical power to the mobile micro-grid power system by automatically selecting one or more of the plurality of power supplies for activation state change based at least partially on one or more fuel consumption parameters associated with the plurality of power supplies so as to minimize fuel consumption for the mobile micro-grid power system and to change the activation state of one or more selected ones of the plurality of power supplies.

4. The mobile micro-grid power system of claim 3, wherein the master controller is operative to select one or more of the plurality of power supplies for activation state change at least partially to reduce excess spinning reserve capacity in the mobile micro-grid power system beyond the determined active reserve power level.

5. The mobile micro-grid power system of claim 3, wherein the master controller is operative to automatically select one or more of the plurality of power supplies for activation state change at least partially to increase efficiency of at least one fuel-consuming generator of the plurality of power supplies in the mobile micro-grid power system.

6. The mobile micro-grid power system of claim 3, wherein the master controller is operative to automatically select one or more of the plurality of power supplies for activation state change at least partially to control the power factor of the mobile micro-grid power system.

7. The mobile micro-grid power system of claim 3, wherein the master controller is operative to automatically select one or more of the plurality of power supplies for activation state change is done at least partially to control peak shaving in the mobile micro-grid power system.

8. The mobile micro-grid power system of claim 1, wherein the master controller is operative to delay activation of one or more specific electrical loads that are currently deactivated for which a load activation request has been received until either the supply of electrical power to the mobile micro-grid power system has been rebalanced to accommodate the requested activation or a determination has been made that a current supply of electrical power to the mobile micro-grid power system is sufficient to accommodate the requested activation.

9. The mobile micro-grid power system of claim 8, wherein the master controller is operative for at least one received load activation request to give permission to activate a partial requested load and to delay permission for activation for a remainder of the requested load until the mobile micro-grid power system is rebalanced.

10. The mobile micro-grid power system of claim 1, wherein the master controller is operative to rebalance the supply of electrical power to the mobile micro-grid power system by selecting at least one currently deactivated power supply for activation and selecting at least one currently activated supply for deactivation and by changing the activation state of one or more selected ones of the plurality of power supplies.

11. The mobile micro-grid power system of claim 10, wherein the master controller is operative to select one or more of the plurality of power supplies for activation state change by preferentially selecting at least one currently deactivated non-fuel consuming power supply for activation and selecting at least one currently activated fuel consuming power supply for deactivation.

12. The mobile micro-grid power system of claim 11, wherein the master controller is operative to preferentially select at least one of a currently deactivated solar energy-based power supply, a currently deactivated wind energy-based power supply, and a currently deactivated battery or capacitive storage-type power supply for activation.

13. The mobile micro-grid power system of claim 1, wherein the master controller is operative to selectively adjust at least one of the power supply profile data, the micro-grid load data, and the load profile based at least partially on at least one of environmental information relating to the environmental condition of the mobile micro-grid power system and location information relating to the geographical location of the mobile micro-grid power system.

14. The mobile micro-grid power system of claim 1, wherein the master controller is operative to rebalance the supply of electrical power to the mobile micro-grid power system by changing an activation state of one or more of the plurality of power supplies based at least partially on an indication of imminent loss of at least one of the power supplies.

* * * * *